United States Patent
Boscaino et al.

(10) Patent No.: US 11,433,717 B2
(45) Date of Patent: Sep. 6, 2022

(54) PROCESS FOR APPLYING NOISE-REDUCING ELEMENTS TO A TYRE FOR VEHICLE WHEELS

(71) Applicant: PIRELLI TYRE S.P.A., Milan (IT)

(72) Inventors: Ivan Gildo Boscaino, Milan (IT); Maurizio Marchini, Seregno (IT); Adriano Girotto, Spresiano (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 16/340,642

(22) PCT Filed: Nov. 22, 2017

(86) PCT No.: PCT/IB2017/057318
§ 371 (c)(1),
(2) Date: Apr. 9, 2019

(87) PCT Pub. No.: WO2018/096458
PCT Pub. Date: May 31, 2018

(65) Prior Publication Data
US 2020/0047564 A1 Feb. 13, 2020

(30) Foreign Application Priority Data
Nov. 22, 2016 (IT) .......................... 102016000117937

(51) Int. Cl.
*B60C 19/00* (2006.01)
*B29D 30/00* (2006.01)
(52) U.S. Cl.
CPC ........ *B60C 19/002* (2013.01); *B29D 30/0061* (2013.01)
(58) Field of Classification Search
CPC .......... B60C 19/002; B29D 2030/0038; B29D 2030/0694; B29D 2030/0695;
(Continued)

(56) References Cited

U.S. PATENT DOCUMENTS 4,824,349 A   4/1989 Oku et al.
5,092,451 A   3/1992 Jones et al.
(Continued)

FOREIGN PATENT DOCUMENTS

CN   1458883 A    11/2003
DE   2740609 A1    3/1979
(Continued)

OTHER PUBLICATIONS

Notice of Allowance for U.S. Appl. No. 15/519,115, filed Apr. 13, 2017 on behalf of Pirelli Tyre S.P.A. dated Dec. 8, 2020 9 pages.
(Continued)

*Primary Examiner* — Robert C Dye
*Assistant Examiner* — Alexander D Booth
(74) *Attorney, Agent, or Firm* — Steinfl + Bruno LLP

(57) ABSTRACT

A process for applying noise-reducing elements to a tyre for vehicle wheels. A plurality of noise-reducing elements are arranged on a feeding belt movable along a predetermined feeding direction. The noise-reducing elements are subsequently aligned along the feeding direction and brought into mutual contact, to then be transferred onto a service plane arranged downstream of the feeding belt along the feeding direction and having, on an upper surface thereof, a continuous film which supports a layer of adhesive material. The layer of adhesive material is applied onto a lower surface of each of the noise-reducing elements taking it from the continuous film. The noise-reducing elements are then transferred one by one onto a conveyor belt arranged downstream of the service plane along the feeding direction. The noise-reducing elements are finally positioned one by one on a radially inner surface of a tyre.

18 Claims, 11 Drawing Sheets

(58) Field of Classification Search
CPC .. B29D 2030/02671; B29D 2030/4456; B29D 2030/069; B29D 19/125; B29D 19/12
USPC ..................................................... 156/394.1
See application file for complete search history.

(56) References Cited

U.S. PATENT DOCUMENTS

| | | | |
|---|---|---|---|
| 5,167,751 A | 12/1992 | Shimizu et al. | |
| 5,169,482 A | 12/1992 | Bottcher | |
| 5,582,664 A | 12/1996 | Sergel et al. | |
| 5,626,706 A | 5/1997 | Akiyama | |
| 5,915,611 A * | 6/1999 | Baldoni | B65H 23/032 226/19 |
| 6,355,126 B1 | 3/2002 | Ogawa | |
| 10,926,499 B2 | 2/2021 | Puppi et al. | |
| 2003/0019725 A1 | 1/2003 | Hoffmann et al. | |
| 2003/0051794 A1 | 3/2003 | Suda et al. | |
| 2003/0150544 A1 | 8/2003 | Naito et al. | |
| 2006/0144896 A1 | 7/2006 | Tubb et al. | |
| 2009/0010749 A1* | 1/2009 | Germain | B65G 47/086 414/801 |
| 2009/0293267 A1 | 12/2009 | Slots et al. | |
| 2011/0308706 A1 | 12/2011 | Sandstrom et al. | |
| 2012/0279828 A1 | 11/2012 | Eschlbeck | |
| 2013/0248071 A1 | 9/2013 | Tanno et al. | |
| 2014/0144574 A1 | 5/2014 | Portinari et al. | |
| 2015/0273944 A1 | 10/2015 | Yukawa | |
| 2015/0328853 A1 | 11/2015 | Denavit et al. | |
| 2016/0263847 A1 | 9/2016 | Janszen et al. | |
| 2017/0225417 A1 | 8/2017 | Puppi et al. | |

FOREIGN PATENT DOCUMENTS

| | | | | |
|---|---|---|---|---|
| EP | 1251092 A2 | 10/2002 | | |
| EP | 1800911 A2 | 6/2007 | | |
| EP | 2239152 A1 | 10/2010 | | |
| EP | 2660037 A1 | 11/2013 | | |
| EP | 2660075 A1 | 11/2013 | | |
| EP | 2746034 A1 | 6/2014 | | |
| GB | 1421679 A | 1/1976 | | |
| JP | S6322632 A | 1/1988 | | |
| JP | H0464521 A | 2/1992 | | |
| JP | 2006130735 A | 5/2006 | | |
| JP | 2006143022 A | 6/2006 | | |
| JP | 2009160762 A | 7/2009 | | |
| JP | 2011020479 A | 2/2011 | | |
| KR | 20100043653 A | 4/2010 | | |
| RU | 1790518 A3 | 1/1993 | | |
| WO | 2013/011396 A1 | 1/2013 | | |
| WO | 2013/061233 A1 | 5/2013 | | |
| WO | 2014/090983 A1 | 6/2014 | | |
| WO | 2016/067192 A1 | 5/2016 | | |
| WO | WO-2017109607 A1 * | 6/2017 | ............... | B65H 3/22 |
| WO | 2018/096458 A1 | 5/2018 | | |

OTHER PUBLICATIONS

Russian Office Action and Search Report for RU Application No. 2019114458 filed on Nov. 22, 2017 on behalf of Pirelli Tyre S.P.A. dated Jan. 21, 2021 12 pages (English + Original).

Second Chinese Office Action for CN Application No. 201580057269 filed on Oct. 27, 2015 on behalf of Pirelli Tyre S.P.A. dated Jul. 17, 2019 6 pages (English + Original).

Notice of Allowance for U.S. Appl. No. 15/519,115, filed Apr. 13, 2017 on behalf of Pirelli Tyre S.P.A. dated Aug. 24, 2020 18 pages.

Chinese First Office Action for Chinese Application No. 201580057269.6 filed Oct. 27, 2015 on behalf of Pirelli Tyre S.P.A. dated Oct. 16, 2018. 10 pages (English Translation + Chinese Original).

International Preliminary Report on Patentability for International Application No. PCT/IB2015/058267 filed Oct. 27, 2015 on behalf of Pirelli Tyre S.P.A. dated Mar. 18, 2016 (English Only).

International Search Report for International Application No. PCT/IB2015/058267 filed Oct. 27, 2015 on behalf of Pirelli Tyre S.P.A. dated Mar. 18, 2016. 5 pages.

International Search Report for International Application No. PCT/IB2017/057318 filed Nov. 22, 2017 on behalf of Pirelli Tyre S.P.A. dated Mar. 21, 2018. 4 pages. (English Only).

Written Opinion for International Application No. PCT/IB2017/057318 filed Nov. 22, 2017 on behalf of Pirelli Tyre S.P.A. dated Mar. 21, 2018. 6 pages (English Only).

Written Opinion for International Application No. PCT/B2015/058267 filed Oct. 27, 2015 on behalf of Pirelli Tyre S.P.A. dated Mar. 18, 2016. 5 pages.

International Preliminary Report on Patentability Chapter I for Application No. PCT/IB2017/057318 filed Nov. 22, 2017 on behalf of Pirelli Tyre S.P.A. dated May 28, 2019. 7 Pages.

Non-Final Office Action for U.S. Appl. No. 15/519,115, filed Apr. 13, 2017 on behalf of Pirelli Tyre S.P.A. dated Sep. 18, 2019. 24 pages.

Northwestern, "Propulsion: How does it work?," retrieved from northwestern.edu on May 18, 2013. 1 Page.

Restriction Reguirement for U.S. Appl. No. 15/519,115, filed Apr. 13, 2017 on behalf of Pirelli Tyre S.P.A.. dated May 22, 2019. 7 pages.

Communication pursuant to Article 94(3) EPC for EP Application No. 15825812.9. dated May 29, 2020. 4 pages.

Final Office Action for U.S. Appl. No. 15/519,115, filed Apr. 13, 2017 on behalf of Pirelli Tyre S.P.A. dated Apr. 9, 2020. 20 Pages.

First Chinese Office Action for CN Application No. 201780070511.2 filed on Nov. 22, 2016 on behalf of Pirelli Tyre S.P.A. dated Feb. 7, 2021 (English + Original) 19 pages.

Japanese Office Action for JP Application No. 2019-518551 filed on Nov. 22, 2017 on behalf of Pirelli Tyre S.P.A. dated May 28, 2021. 4 pages (English + Original).

* cited by examiner

PROCESS FOR APPLYING NOISE-REDUCING ELEMENTS TO A TYRE FOR VEHICLE WHEELS

CROSS-REFERENCE TO RELATED APPLICATIONS

The present application is the U.S. National Stage of International Patent Application No. PCT/IB2017/057318 filed on Nov. 22, 2017 which, in turn, claims priority to Italian Patent Application No. 102016000117937 filed on Nov. 22, 2016.

The present invention relates to a process and an apparatus for applying noise-reducing elements to a tyre for vehicle wheels.

Preferably, the process and the apparatus of the present invention allow an automatic or substantially automatic application of the aforementioned noise-reducing elements onto the tyre.

The term "automatic" is used to indicate an operation carried out by mechanical devices, without the need for manual intervention of an operator.

The expression "mechanical devices" is used to indicate entirely mechanical, electro-mechanical, hydraulic or pneumatic devices, possibly controlled by a control unit through suitable software.

The expression "substantially automatic" is used to indicate that most of the operations are carried out by the aforementioned mechanical devices and the manual intervention of an operator is limited to few specific operations. In the specific case of the present invention, the manual intervention of the operator is at most limited to the initial arrangement of the noise-reducing elements, for example to the positioning of the noise-reducing elements on a conveyor belt.

The expression "noise-reducing element" is used to indicate an element that, upon being associated with a tyre for vehicle wheels, has the capability to attenuate the noise produced by the tyre in use. Such a capability is preferably given to the aforementioned element by the type of material which the aforementioned element is made from. A material suitable for this purpose is for example a sound-absorbing porous material, like for example an expanded polymeric material, like for example open-cell foamed polyurethane.

The term "elastomeric" is used to refer to a composition comprising at least one elastomeric polymer and at least one reinforcing filler. Preferably, such a composition further comprises additives like, for example, a cross-linking agent and/or a plasticizer. Thanks to the presence of the cross-linking agent, such a material can be cross-linked through heating, so as to form the final manufactured product.

The terms "radial" and "axial" and the expressions "radially inner/outer" and "axially inner/outer" are used referring to the radial direction of the tyre (i.e. to a direction perpendicular to the rotation axis of the tyre) and to the axial direction of the tyre (i.e. to a direction parallel to the rotation axis of the tyre). The terms "circumferential" and "circumferentially", on the other hand, are used referring to the annular extension of the tyre.

The expression "feeding direction" is used to indicate a direction parallel to the longitudinal direction of a feeding belt. The feeding direction thus corresponds to the advancing direction of the feeding belt.

The expressions "low", "below", "lower" or "under", and "high", "over", "upper" or "above" are used to indicate a relative position with respect to the aforementioned feeding belt.

The expressions "downstream" or "head", and "upstream" or "tail" are used referring to the aforementioned feeding direction. Therefore, assuming for example a feeding direction from left to right, a "downstream" or "head" position with respect to any reference element indicates a position at the right of said reference element and an "upstream" or "tail" position indicates a position at the left of said reference element.

The operation through which two or more noise-reducing elements are brought into mutual contact along said feeding direction is also identified with the expression "compacting".

A tyre for vehicle wheels generally comprises a carcass structure comprising at least one carcass ply formed of reinforcing cords incorporated in a matrix of elastomeric material. The carcass ply has end edges respectively engaged with annular anchoring structures. The latter are arranged in the areas of the tyre usually identified with the name "beads" and each of them is normally formed by a substantially circumferential annular insert on which at least one filling insert is applied, in a radially outer position thereof. Such annular inserts are commonly identified as "bead cores" and have the task of keeping the tyre firmly fixed to the anchoring seat specifically provided in the rim of the wheel, thus preventing, in operation, the radially inner end edge of the tyre from coming out from such a seat.

Specific reinforcing structures having the function of improving the torque transmission to the tyre can be provided at the beads.

A crown structure is associated in a radially outer position with respect to the carcass structure.

The crown structure comprises a belt structure and, in a radially outer position with respect to the belt structure, a tread band made of elastomeric material.

The belt structure comprises one or more belt layers arranged radially one on top of the other and having textile or metallic reinforcing cords with a crossed orientation and/or an orientation substantially parallel to the direction of circumferential extension of the tyre.

A layer of elastomeric material, called "under-belt", can be provided between the carcass structure and the belt structure, said layer having the function of making the radially outer surface of the carcass structure as uniform as possible for the subsequent application of the belt structure.

A so-called "under-layer" made of elastomeric material can be arranged between the tread band and the belt structure, the under-layer having properties suitable for ensuring a steady union of the tread band to the belt structure.

Respective sidewalls of elastomeric material are applied on the side surfaces of the carcass structure, each extending from one of the side edges of the tread band up to the respective annular anchoring structure to the beads.

WO 2016/067192, to the same Applicant, discloses a process and an apparatus for applying a noise-reducing element to a tyre for vehicle wheels. The noise-reducing element is arranged on a first conveyor belt moved along a feeding direction and having, on an upper surface thereof, a continuous film which supports a layer of adhesive material.

The noise-reducing element is subsequently pressed against the continuous film so as to make it firmly adhere to a portion of the layer of adhesive material. By means of the movement of the first conveyor belt along the feeding direction, the noise-reducing element is subsequently transferred to a second conveyor belt arranged downstream of the first conveyor belt along the aforementioned feeding direction. During such transfer, the continuous film is held at the first conveyor belt and, as soon as the noise-reducing element has left the first conveyor belt, the portion of layer of adhesive material that adheres to the noise-reducing element is detached from the layer of adhesive material which is on the first conveyor belt. The detachment can take place as a consequence of the relative movement of the second conveyor belt with respect to the first conveyor belt (in the case in which the adhesive material has weak internal bonds) or through the cutting action exerted by a suitable blade provided between the two conveyor belts (in the case in which the adhesive material has very strong internal bonds). The noise-reducing element is finally picked from the second conveyor belt up and positioned in a predetermined position on a radially inner surface of the tyre.

The Applicant observes that the invention described in WO 2016/067192 makes it possible to obtain a high automation of the gluing process of the noise-reducing elements to the tyres, thus obtaining an increased productivity of the lines dedicated to manufacturing of tyres provided with noise-reducing elements.

The Applicant has considered the problem of obtaining a further increase in productivity in combination with the repeatability of the operations of adhesion of a layer of adhesive material to each noise-reducing element.

The Applicant has found that by aligning and compacting the noise-reducing elements before the layer of adhesive material is arranged on each of them, and in particular by suitably manipulating the single noise-reducing elements acting at least in two directions to bring them substantially automatically to the aforementioned mutual alignment and compacting condition, and by suitably moving the single noise-reducing elements along their own feeding direction after having applied the respective layer of adhesive material onto each of them, it is possible to obtain a clean and precise detachment of the layer of adhesive material adhered to a noise-reducing element from the one adhered to a immediately subsequent noise-reducing element along the feeding direction of the noise-reducing elements. In this way, the productivity is further increased and the repeatability in the distribution of adhesive layer on each noise-reducing element is obtained.

The present invention therefore relates, in a first aspect thereof, to a process for applying noise-reducing elements to a tyre for vehicle wheels.

Preferably, a plurality of noise-reducing elements is arranged, preferably spaced apart from one another, on a feeding belt movable along a predetermined feeding direction.

Preferably, at least two of said noise-reducing elements are aligned along said feeding direction.

Preferably, said at least two noise-reducing elements are brought into mutual contact along said feeding direction.

Preferably, said at least two noise-reducing elements are transferred from said feeding belt onto a service plane arranged downstream of said feeding belt along said feeding direction and having, on an upper surface thereof, a continuous film which supports a layer of adhesive material.

Preferably, said layer of adhesive material is applied onto a lower surface of each of said at least two noise-reducing elements taking it from said continuous film.

Preferably, said at least two noise-reducing elements are transferred one by one from said service plane to a conveyor belt arranged downstream of said service plane along said feeding direction.

Preferably, said at least two noise-reducing elements are positioned one by one onto a radially inner surface of a tyre.

The Applicant believes that the aforementioned method, producing a clean and precise detachment of the layer of adhesive material adhered to two noise-reducing elements arranged in succession along the feeding direction thereof thanks to the prior alignment and compacting of the noise-reducing elements along the aforementioned feeding direction, effectively solves the aforementioned problems regarding the productivity of the production lines dedicated to manufacturing tyres provided with noise-reducing elements, at the same time obtaining the repeatability of the distribution operations of the layer of adhesive material on each noise-reducing element.

In a second aspect thereof, the present invention relates to an apparatus for applying noise-reducing elements to a tyre for vehicle wheels.

Preferably, a feeding belt is provided, the feeding belt being configured to feed noise-reducing elements movable along a predetermined feeding direction.

Preferably, a first pushing element is provided, the first pushing element being movable along a direction perpendicular to said feeding direction to align at least two of said noise-reducing elements along said feeding direction.

Preferably, a second pushing element is provided, the second pushing element being movable along said feeding direction to bring said at least two noise-reducing elements in mutual contact along said feeding direction.

Preferably, a service plane is arranged downstream of said feeding belt along said feeding direction, the service plane having, on an upper surface thereof, a continuous film which supports a layer of adhesive material.

Preferably, said continuous film is movable along said feeding direction.

Preferably, a pressing member is provided, the pressing member being configured to press said at least two noise-reducing elements against the upper surface of said service plane so that said at least two noise-reducing elements firmly adhere to a portion of said layer of adhesive material.

Preferably, a conveyor belt is arranged downstream of said service plane along said feeding direction.

Preferably, said conveyor belt is movable along said feeding direction.

Preferably, a gripping member is provided, the gripping member being configured to pick said at least two noise-reducing elements up and to position them on a radially inner surface of a tyre.

The apparatus described above allows the method described above to be carried out.

The present invention can have, in at least one of the aforementioned aspects, at least one of the preferred features described hereinafter.

Preferably, arranging said plurality of noise-reducing elements on said feeding belt comprises positioning one after the other said noise-reducing elements on a loading belt arranged upstream of said feeding belt along said feeding direction. Said noise-reducing elements can advantageously be positioned on said loading belt substantially randomly, i.e. not only spaced apart but also without being perfectly aligned, so as not to cause any slowing of the productivity of the line. The desired alignment and mutual positioning is indeed obtained automatically subsequently.

Preferably, during or after positioning said noise-reducing elements on said loading belt and before aligning said at least two noise-reducing elements said loading belt is moved along said feeding direction while keeping said feeding belt stationary.

Preferably, the movement of said loading belt proceeds until an end portion of a first noise-reducing element of said at least two noise-reducing elements is arranged above said feeding belt.

Preferably, said loading belt and said feeding belt are subsequently moved in synchrony along said feeding direction until said first noise-reducing element is entirely arranged above said feeding belt. In this way, the automatic transfer of each of the noise-reducing elements from the loading belt to the feeding belt is obtained.

Preferably, aligning said at least two noise-reducing elements comprises pushing said at least two noise-reducing elements in abutment against a reference wall parallel to said feeding direction.

Preferably, said reference wall is associated with said feeding belt.

Preferably, said at least two noise-reducing elements have a predetermined width.

Preferably, said at least two noise-reducing elements have a predetermined length.

Preferably, aligning said at least two noise-reducing elements comprises pushing said at least two noise-reducing elements against said reference wall through a first pushing element which is moved, in a direction perpendicular to said feeding direction, with a predetermined stroke defined as a function of the width of said at least two noise-reducing elements. The length of the stroke carried out by the aforementioned first pushing element along the aforementioned direction perpendicular to the feeding direction is therefore adjustable depending on the width of the noise-reducing elements which are processed, so as to obtain the desired alignment of the noise-reducing elements without at the same time deforming them excessively.

Preferably, said at least two noise-reducing elements are brought into mutual contact while they are kept aligned along said feeding direction.

The Applicant believes that such a provision makes it possible to obtain an optimal mutual positioning of the noise-reducing elements, such optimal mutual positioning allowing an optimal detachment of the layer of adhesive material adhered to a noise-reducing element from the one adhered to the immediately subsequent noise-reducing element along the feeding direction of the noise-reducing elements.

The Applicant also believes that the provision of compacting the noise-reducing elements after they have been aligned (and therefore of aligning the noise-reducing elements before they are brought into mutual contact along the feeding direction) makes it possible to ensure that the desired mutual positioning of the noise-reducing elements is obtained irrespective of the material from which they are made. The Applicant indeed believes that in the case in which the noise-reducing elements are made of a material having a high friction coefficient, it may not be possible to obtain a perfect alignment of possible noise-reducing elements which are already compacted. This is because the aforementioned friction coefficient would lead the noise-reducing elements to move in an unpreventable manner when the first pushing element is moved away from them after the alignment operation.

Preferably, said at least two noise-reducing elements are brought into mutual contact while said feeding belt and said continuous film are stationary.

Preferably, bringing said at least two noise-reducing elements into mutual contact comprises pushing a first noise-reducing element of said at least two noise-reducing elements against a second noise-reducing element of said at least two noise-reducing elements, said second noise-reducing element being arranged on said feeding belt downstream of said first noise-reducing element.

Preferably, said first noise-reducing element is pushed against said second noise-reducing element through a second pushing element which is moved along said feeding direction with a predetermined stroke defined as a function of the length of said at least two noise-reducing elements. The length of the stroke carried out by the aforementioned second pushing element along the feeding direction is therefore adjustable depending on the length of the noise-reducing elements which are processed, so as to obtain the desired mutual contact of the noise-reducing elements without at the same time deforming them excessively.

Preferably, said first noise-reducing element is pushed against said second noise-reducing element after said second noise-reducing element has been aligned and brought into contact with a third noise-reducing element which is at least partially arranged on said service plane. In this way, the third noise-reducing element, being located in part above the service plane and thus having a layer of adhesive material adhered both onto the lower face and onto the continuous film supported by the service plane, does not move along the feeding direction because of the pushing action exerted by the first reducing element against the second noise-reducing element (and by the latter against the third noise-reducing element). The third noise-reducing element thus acts as an abutment element against the pushing action exerted by the first pushing element against the second noise-reducing element, allowing an optimal compacting to be obtained between first noise-reducing element and second noise-reducing element.

Preferably, said second noise-reducing element is aligned and brought into contact directly against said third noise-reducing element.

Alternatively, said second noise-reducing element is aligned and brought into contact with said third noise-reducing element through interposition of one or more further noise-reducing elements previously aligned and brought into mutual contact along said feeding direction.

Preferably, transferring said at least two noise-reducing elements from said feeding belt onto said service plane comprises moving said feeding belt and said continuous film in synchrony along said feeding direction.

Preferably, applying said layer of adhesive material comprises pressing said at least two noise-reducing elements against the upper surface of said service plane.

Preferably, transferring one by one said at least two noise-reducing elements from said service plane to said conveyor belt comprises moving said continuous film and said conveyor belt in synchrony along said feeding direction until said first noise-reducing element is at least partially arranged above said conveyor belt.

Preferably, after the aforementioned synchronous movement said conveyor belt is moved along said feeding direction while keeping said continuous film stationary. In this way, a detachment of the noise-reducing element positioned each time on the conveyor belt from those positioned on the service plane is obtained.

Preferably, after having transferred said at least two noise-reducing elements to said conveyor belt and before positioning said at least two noise-reducing elements on said tyre, said at least two noise-reducing elements are transferred one by one to an unloading belt arranged downstream of said conveyor belt along said feeding direction.

Preferably, the transfer of said at least two noise-reducing elements to said unloading belt is obtained as a consequence of the synchronous movement of said conveyor belt and of said unloading belt along said feeding direction.

Preferably, after having transferred each noise-reducing element to said unloading belt and before positioning said at least two noise-reducing elements on said tyre, said unloading belt is moved along said feeding direction while keeping said conveyor belt stationary. Such a provision makes it possible to sufficiently move each noise-reducing element away from the one which is immediately subsequent, so as to allow the noise-reducing element to be picked up for the subsequent positioning on the tyre without risking to accidentally bump the immediately subsequent noise-reducing element along the feeding direction.

Preferably, the position of said continuous film on the upper surface of said service plane along the direction perpendicular to said feeding direction can be adjusted. Such a provision makes it possible to keep the continuous film, and consequently the layer of adhesive material supported by it, in a centered position depending on the position taken u by the noise-reducing elements on the feeding belt along the aforementioned perpendicular direction after the alignment and compacting operations.

Preferably, the speed of said feeding belt can be adjusted as a function of the advancing speed of said continuous film on said service plane. In this way, it is possible to obtain the desired compacting of the noise-reducing elements irrespective of the advancing speed of the continuous film. In particular, it is ensured that the speed of the feeding belt is always slightly greater than that of the continuous film.

Preferably, said second pushing element is movable both along said feeding direction and along a vertical direction. The movement along the feeding direction allows the aforementioned compacting of the noise-reducing elements. The movement along the vertical direction makes it possible to periodically take the second pushing element into an out-of-bulk position after having compacted some of the noise-reducing elements and before compacting further noise-reducing elements.

Preferably, a loading belt where the noise-reducing elements are loaded is arranged upstream of said feeding belt along said feeding direction. The operator can position the noise-reducing elements on such a loading belt without paying particular attention to their mutual positioning.

Preferably, an unloading belt from where the noise-reducing elements are unloaded is arranged downstream of said conveyor belt along said feeding direction. The provision of such an unloading belt allows each noise reducing element to be gripped automatically for being then positioned on the tyre, without risking to accidentally contact the subsequent noise-reducing element along the feeding direction.

Preferably, said service plane comprises a central portion arranged below said pressing member.

Preferably, said service plane comprises a tail portion mechanically disengaged from the central portion and arranged upstream of said central portion along said feeding direction.

Preferably, said service plane comprises a head portion mechanically disengaged from the central portion and arranged downstream of said central portion along said feeding direction.

Advantageously, the provision of three portions mechanically disengaged from one another allows the adjustment of the position of the head portion and/or the tail portion with respect to the central portion. Such a provision is useful for allowing the adjustment of the position of the continuous film with respect to the position of the noise-reducing elements depending for example on the dimensions of the noise-reducing elements being used each time.

Preferably, an unwinding reel configured to unwind said continuous film is arranged under said service plane at said tail portion.

Preferably, a winding reel configured to wind said continuous film is arranged under said service plane at said head portion.

Preferably, said continuous film extends from said unwinding reel to said winding reel passing over said tail portion, said central portion and said head portion of said service plane.

Preferably, an adjusting device for adjusting the position of said continuous film on the upper surface of said service plane in a direction perpendicular to said feeding direction is provided.

Preferably, said adjusting device comprises at least one actuator device acting on said head portion and/or tail portion of said service plane to move said head portion and/or tail portion with respect to said central portion in a direction perpendicular to said feeding direction.

Preferably, first adjusting members configured to adjust the stroke of said first pushing element are provided.

Preferably, second adjusting members configured to adjust the stroke of said second pushing element are provided.

Preferably, third adjusting members configured to adjust the stroke of said pressing member are provided.

Each of the aforementioned stroke adjusting members makes it possible to set the optimal stroke of the respective pushing/pressing members as a function of the dimensions of the noise-reducing elements being used each time.

Further features and advantages of the present invention will become clearer from the following detailed description of preferred embodiments thereof, made with reference to the attached drawings.

Figure 1:
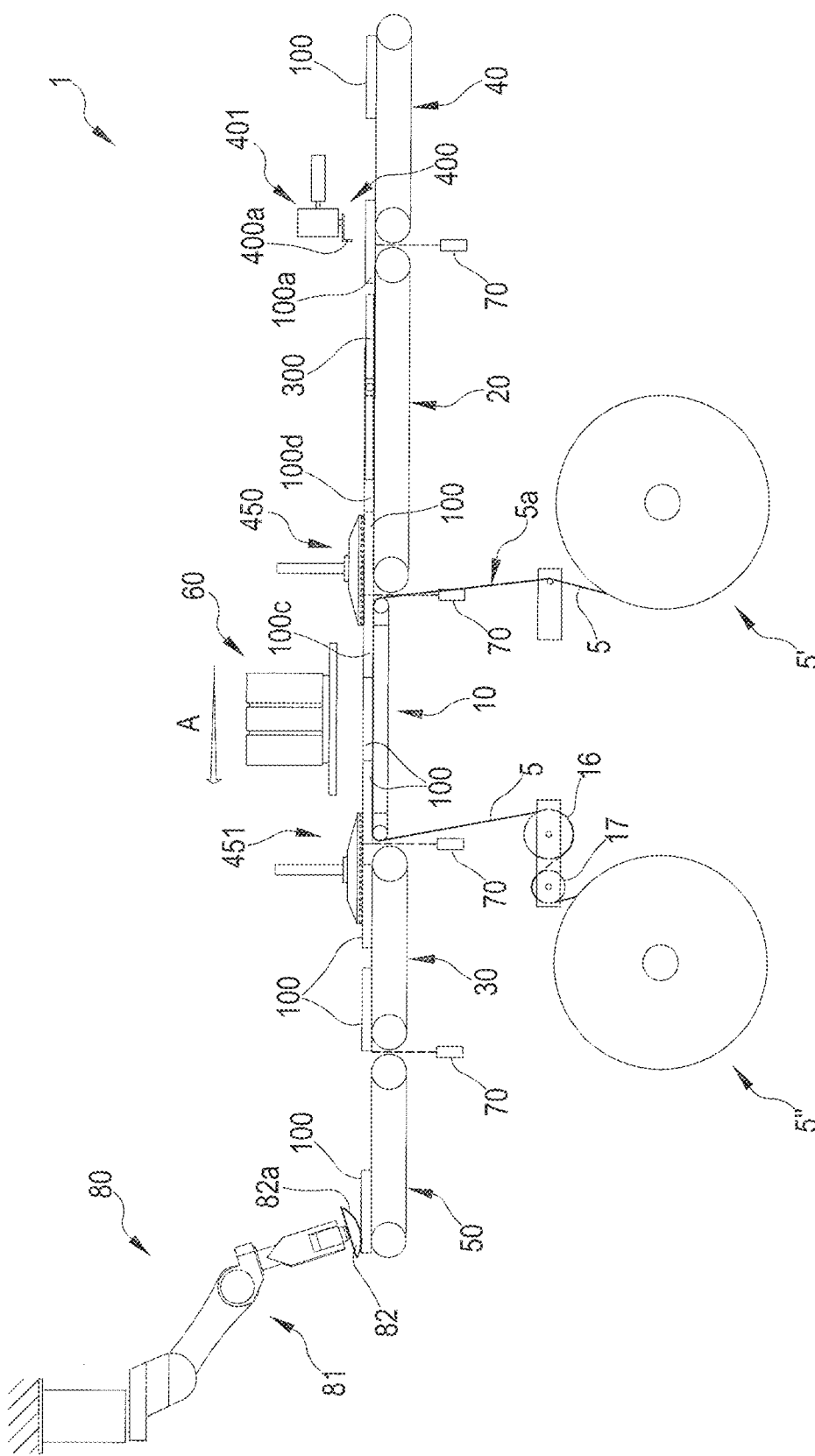
FIG. 1 is a schematic side view of an exemplifying embodiment of an apparatus for automatically applying noise-reducing elements to a tyre for vehicle wheels in accordance with the present invention, such an apparatus being illustrated in a first operative configuration thereof.

In FIGS. 1-9, reference numeral 1 wholly indicates an exemplifying embodiment of an apparatus for automatically applying one by one a plurality of noise-reducing elements 100 on a radially inner surface of a tyre for vehicle wheels, in accordance with the present invention.

Figure 2:
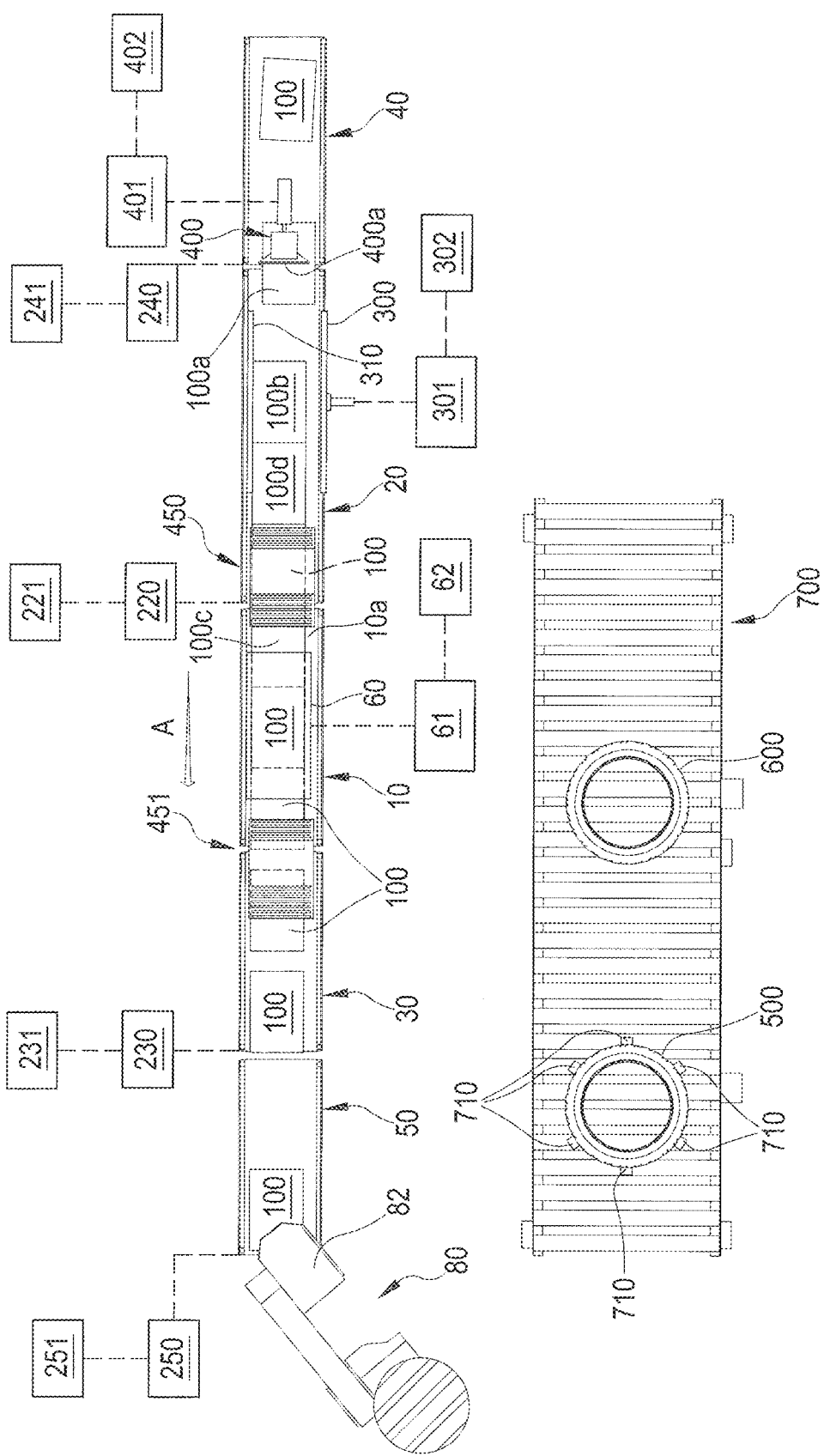
FIG. 2 is a schematic view from above of the apparatus of FIG. 1.
Figure 12:
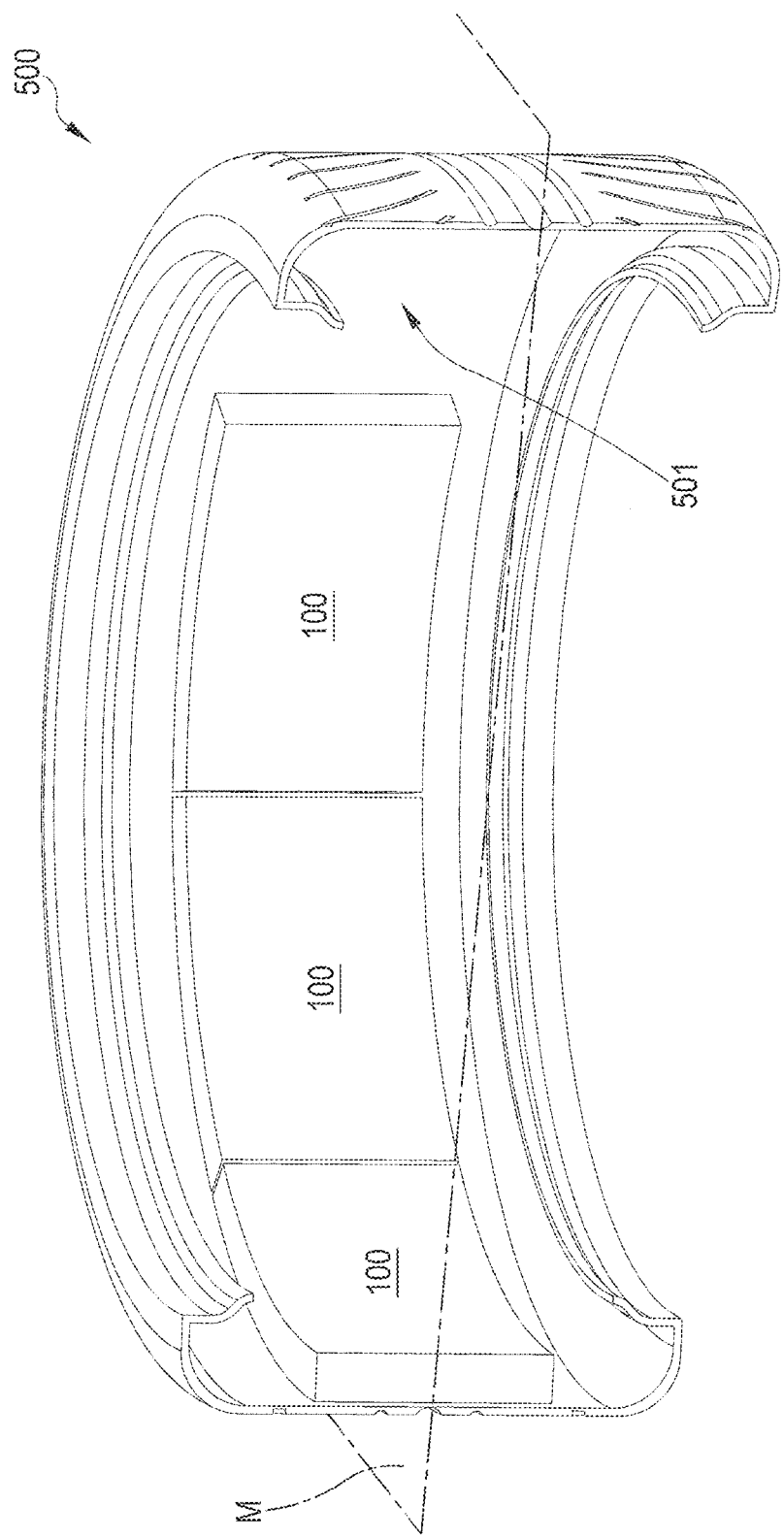
FIG. 12 is a schematic perspective view of a section of a tyre for vehicle wheels on the inner surface of which a plurality of noise-reducing elements have been glued, through the apparatus of FIG. 1.

An example of such a tyre is illustrated in FIGS. 2 and 12 and is indicated with 500. Preferably, it is a tyre for four-wheeled vehicles, more preferably for high-performance vehicles.

As illustrated in FIG. 12, the noise-reducing elements 100 are glued along the circumferential direction of the tyre 500, preferably symmetrically with respect to an axial middle plane M of the tyre 500.

FIG. 2 illustrates a further tyre, indicated with 600, on which it is foreseen to glue the noise-reducing elements 100, again through the apparatus 1 described herein, once the process of gluing the noise-reducing elements 100 onto the tyre 500 is complete.

The tyres 500 and 600 are preferably arranged on a roller conveyor belt 700 arranged close to the apparatus 1.

During the gluing operations, the tyre 500 on which the noise-reducing elements 100 are glued is held in position on the roller conveyor belt 700 by suitable holding members 710. In the specific example illustrated herein, such a holding members 710 are vertically movable with respect to the roller conveyor belt 700 and are uniformly distributed around the tyre 500, so as to also obtain the centering of the tyre 500 with respect to the aforementioned holding members 710. In particular, in the example of FIG. 2 there are six holding members 710 equally spaced angularly by 60°.

The noise-reducing elements 100 preferably have a rectangular parallelepiped shape. More preferably, they have a width comprised between about 100 mm and about 250 mm, a length comprised between about 100 mm and about 300 mm and a thickness comprised between about 15 mm and about 50 mm. However, noise reducing elements 100 can have shapes and sizes different from those indicated herein.

As illustrated in FIG. 12, preferably the noise-reducing elements 100 are glued onto the radially inner surface 501 of the tyre 100 along the circumferential direction of the latter, arranging the longer sides of the noise-reducing elements 100 substantially parallel to the axial middle plane M of the tyre 100.

Preferably, the mutual positioning of the noise-reducing elements 100 on the radially inner surface 501 of the tyre 100 is such as to leave a gap between two adjacent noise-reducing elements 100. However, noise reducing elements 100 can be in direct mutual contact as well.

Preferably, the circumferential extension of the portion of radially inner surface 501 of the tyre 500 on which the noise-reducing elements 100 are glued (hereinafter reference will be made to such a circumferential extension using the term "coverage") is equal to at least 50% of the circumferential extension of the radially inner surface 501 of the tyre 500. Depending on the circumferential size of the tyre 100, the aforementioned coverage can for example be comprised between about 65% and about 95%, preferably between about 70% and about 90% of the circumferential extension of the radially inner surface 501 of the tyre 500. As the circumferential size of the tyre 500 varies it is possible, if necessary, to use noise-reducing elements 100 of different length to obtain the desired coverages.

The noise-reducing elements 100 are preferably made of sound-absorbing porous material, for example expanded polymeric material, preferably open-cell foamed polyurethane. However, a different material having similar capability to reduce noise can be used as well.

The density of the noise-reducing elements 100 is preferably comprised between about 20 Kg/m$^3$ and about 200 Kg/m$^3$. In a specific embodiment, such a density is equal to about 40 Kg/m$^3$.

With particular reference to FIGS. 1-10, the apparatus 1 comprises a service plane 10 on the upper surface 10a of which (FIG. 10) a continuous film 5 which supports a layer of adhesive material 5a, preferably of the pressure-sensitive type, extends.

The service plane 10 comprises a tail portion 10', a head portion 10" and a central portion 10'''. The tail portion 10' is arranged upstream of the central portion 10''' along the feeding direction A. The head portion 10" is arranged downstream of the central portion 10''' along the feeding direction A.

The tail 10' and head 10" portions are mechanically disengaged from the central portion 10''', so as to be movable with respect to the central portion 10''' upon command of respective actuator devices 11, 12. Such a provision makes it possible to adjust the position of the continuous film 5 on the upper surface 10a of the service plane 10 in a direction perpendicular to the feeding direction A, as described below.

Preferably, the continuous film 5 is made of or coated with a non-stick material. For example, at least one face of the continuous film 5 (in particular at least the face opposite the one which is in contact with the upper surface 10a of the service plane 10) is made non-stick through a surface treatment with silicones.

The continuous film 5 is initially collected in an unwinding reel 5' preferably arranged below the service plane 10 close to the tail portion 10' thereof. The continuous film 5 extends from the unwinding reel 5' passing over the upper surface 10a of the service plane 10 until a winding reel 5" is reached. The winding reel 5" is preferably arranged below the service plane 10 close to the head portion 10" thereof.

During the unwinding from the unwinding reel 5', the continuous film 5 is moved on the upper surface 10a of the service plane 10 along the feeding direction A to then be collected on the winding reel 5".

The movement of the continuous film 5 along the feeding direction A is controlled by a drive member 51 associated with the unwinding reel 5' and by a drive member 52 associated with the unwinding reel 5". Such movement is adjustable through respective speed adjusting devices 51a, 52a associated with the aforementioned drive members 51, 52.

With reference to FIGS. 1-9, the apparatus 1 further comprises, upstream of the service plane 10 with reference to the feeding direction A, a feeding belt 20 also movable along a feeding direction A. The movement of the feeding belt 20 along the feeding direction A is controlled by a suitable drive member 220 (FIG. 2). The advancing speed of the feeding belt 20 along the feeding direction A is adjustable through a speed adjusting device 221 associated with the drive member 220.

The apparatus 1 further comprises, downstream of the service plane 10 with reference to the feeding direction A, a conveyor belt 30, also movable along a feeding direction A. The movement of the conveyor belt 30 along the feeding direction A is controlled by a suitable drive member 230 (FIG. 2). The advancing speed of the conveyor belt 30 along the feeding direction A is adjustable through a speed adjusting device 231 associated with the drive member 230.

Preferably, in the exemplifying embodiment illustrated herein, a loading belt 40 where the noise-reducing elements 100 are loaded is provided upstream of the feeding belt 20 with reference to the feeding direction A. The loading belt 40 is also movable along the feeding direction A. The movement of the loading belt 40 along the feeding direction A is controlled by a suitable drive member 240 (FIG. 2). The advancing speed of the loading belt 40 along the feeding direction A is adjustable through a speed adjusting device 241 associated with the drive member 240. An encoder (not illustrated) is associated with the loading belt 40, preferably at a head portion thereof, to control the movement of the loading belt 40 along the feeding direction A.

Preferably, in the exemplifying embodiment illustrated herein, an unloading belt 50 from where the noise-reducing elements 100 are unloaded is provided downstream of the conveyor belt 30 with reference to the feeding direction A. The unloading belt 50 is also movable along the feeding direction A. The movement of the unloading belt 50 along the feeding direction A is controlled by a suitable drive member 250 (FIG. 2). The advancing speed of the unloading belt 50 along the feeding direction A is adjustable through a speed adjusting device 251 associated with the drive member 250.

The service plane 10 and the belts 20, 30, 40 and 50 are aligned, and arranged one after the other in accordance with what is described above, along the feeding direction A.

The adjusting devices 51a, 52a, 221, 231, 241, 251 act selectively on the respective drive members 51, 52, 220, 230, 240, 250 independently from one another so as to be able to move the continuous film 5 and the belts 20, 30, 40, 50 independently from one another and possibly at different speeds, if necessary or desired.

In the attached figures:
reference numeral 100a indicates, in FIGS. 1 and 2, a noise-reducing element 100 about to pass from the loading belt 40 to the feeding belt 20 and, in FIGS. 6-9, the aforementioned noise-reducing element 100a when it is entirely arranged on the feeding belt 20;
reference numeral 100b indicates a noise-reducing element 100 arranged on the feeding belt 20 downstream of the noise-reducing element 100a along the feeding direction A;
reference numeral 100c indicates a noise-reducing element 100 already transferred onto the service plane 10 while the noise-reducing elements 100a and 100b are in the positions described above;
reference numeral 100d indicates a noise-reducing element 100 arranged between the noise-reducing element 100b and the noise-reducing element 100c.

In the specific example illustrated herein, the noise-reducing elements 100 are positioned on the loading belt 40 to be subsequently transferred to the feeding belt 20.

Beforehand, the noise-reducing elements 100 are picked up, manually by an operator, or automatically through a robotized arm (not illustrated), from a suitable tank (not illustrated) or, alternatively, cutting them from a sheet of large dimensions (for example 800×1200 mm) positioned close to the loading belt 40.

The noise-reducing elements 100 are then positioned on the loading belt 40, manually or through the aforementioned robotized arm, so that each noise-reducing element 100 positioned on the loading belt 40 is spaced from the noise-reducing element 100 previously positioned on the loading belt 40.

The passage of the noise-reducing elements 100 from the loading belt 40 to the feeding belt 20 takes place as a consequence of the movement of the loading belt 40 and of the feeding belt 20 along the feeding direction A. In particular, each noise-reducing element 100 arranged on the loading belt 40 is firstly moved towards the feeding belt 20 as a consequence of the movement of the loading belt 40 along the feeding direction A, while keeping the feeding belt 20 stationary until a head portion of the noise-reducing element 100 is arranged above the feeding belt 20. Thereafter, the movement of the loading belt 40 stops and only the feeding belt 20 moves along the feeding direction A until the entire noise-reducing element 100 is arranged above the feeding belt 20.

Once positioned on the feeding belt 20, the noise-reducing elements 100 are subject to an alignment and compacting operation, as described hereinafter.

The noise-reducing elements 100 subsequently pass from the feeding belt 20 to the service plane 10.

The passage of the noise-reducing elements 100 from the feeding belt 20 to the service plane 10 takes place as a consequence of the synchronous movement of the feeding belt 20 and of the continuous film 5 along the feeding direction A.

Following the transfer of the noise-reducing elements 100 on the service plane 10, their lower face is made to adhere firmly to a portion of the layer of adhesive material 5a provided on the upper face of the portion of continuous film 5 arranged on the upper surface 10a of the service plane 10. In particular, the portion of layer of adhesive material 5a that is located below each noise-reducing element 100 attaches firmly to the lower face of the noise-reducing element 100 and remains attached to such a noise-reducing element 100 during the subsequent movement of the continuous film 5 along the feeding direction A. Therefore, the portion of continuous film 5 wound on the winding reel 5" is substantially free of the aforementioned layer of adhesive material 5a.

The noise-reducing elements 100 subsequently pass from the service plane 10 to the conveyor belt 30. Such a passage takes place as a consequence of the synchronous movement of the continuous film 5 and of the conveyor belt 30 along the feeding direction A. As soon as each noise-reducing element 100 is arranged, preferably entirely, above the conveyor belt 30, the latter is moved along the feeding direction A while keeping the continuous film 5 stationary, so as to obtain the clean and precise detachment of the layer of adhesive material 5a associated with the noise-reducing element just transferred to the conveyor belt 30 from the layer of adhesive material 5a associated with the continuous film 5 supported by the service plane 10.

The noise-reducing elements 100 subsequently pass from the conveyor belt 30 to the unloading belt 50.

The passage of the noise-reducing elements 100 from the conveyor belt 30 to the unloading belt 50 takes place as a consequence of the synchronous movement of the conveyor belt 30 and of the unloading belt 50 along the feeding direction A. As soon as each noise-reducing element 100 is arranged, preferably entirely, above the unloading belt 50, the latter is moved along the feeding direction A while keeping the conveyor belt 30 stationary, so as to take the noise-reducing element 100 arranged on the unloading belt 50 away from the one which is immediately subsequent and which is still arranged on the conveyor belt 30.

From what has been illustrated above, it can be seen that:
when the noise-reducing elements 100 pass from the loading belt 40 to the feeding belt 20 and, thereafter, from the latter to the service plane 10, they are free of adhesive material;
when the noise-reducing elements 100 are on the service plane 10, a portion of the layer of adhesive material 5a present on the continuous film 5 supported by the service plane 10 adheres to the lower face of each of the aforementioned noise-reducing elements 100;
when the noise-reducing elements 100 pass from the service plane 10 to the conveyor belt 30 and, thereafter, from the latter to the unloading belt 50, the aforementioned portion of layer of adhesive material 5a remains associated with the lower face of each of the aforementioned noise-reducing elements 100.

The continuous film 5 is preferably made of a non-stick material (for example paper or polymeric material like polyethylene PE, polypropylene PP or polyethylene terephthalate PET, whose surface is treated with silicones). The adhesion force of the layer of adhesive material 5a on the continuous film 5 is therefore substantially lower than the adhesion force of the layer of adhesive material 5a on the lower face of the noise-reducing elements 100.

Such a continuous film 5 has a width equal to or greater than that of the noise-reducing elements 100. Preferably, the possible difference in width between continuous film 5 and noise-reducing elements 100 is not greater than about 2 mm.

The adhesive applied on the continuous film 5 preferably has a thickness (including the layer of adhesive material 5a) comprised between 30 and 250 μm, for example equal to about 80 μm.

Examples of continuous film 5 (provided with the layer of adhesive material 5a) that can be used are: 300LSE and 9773 of 3M Company and 5015T of Nitto Europe NV.

Figure 3:
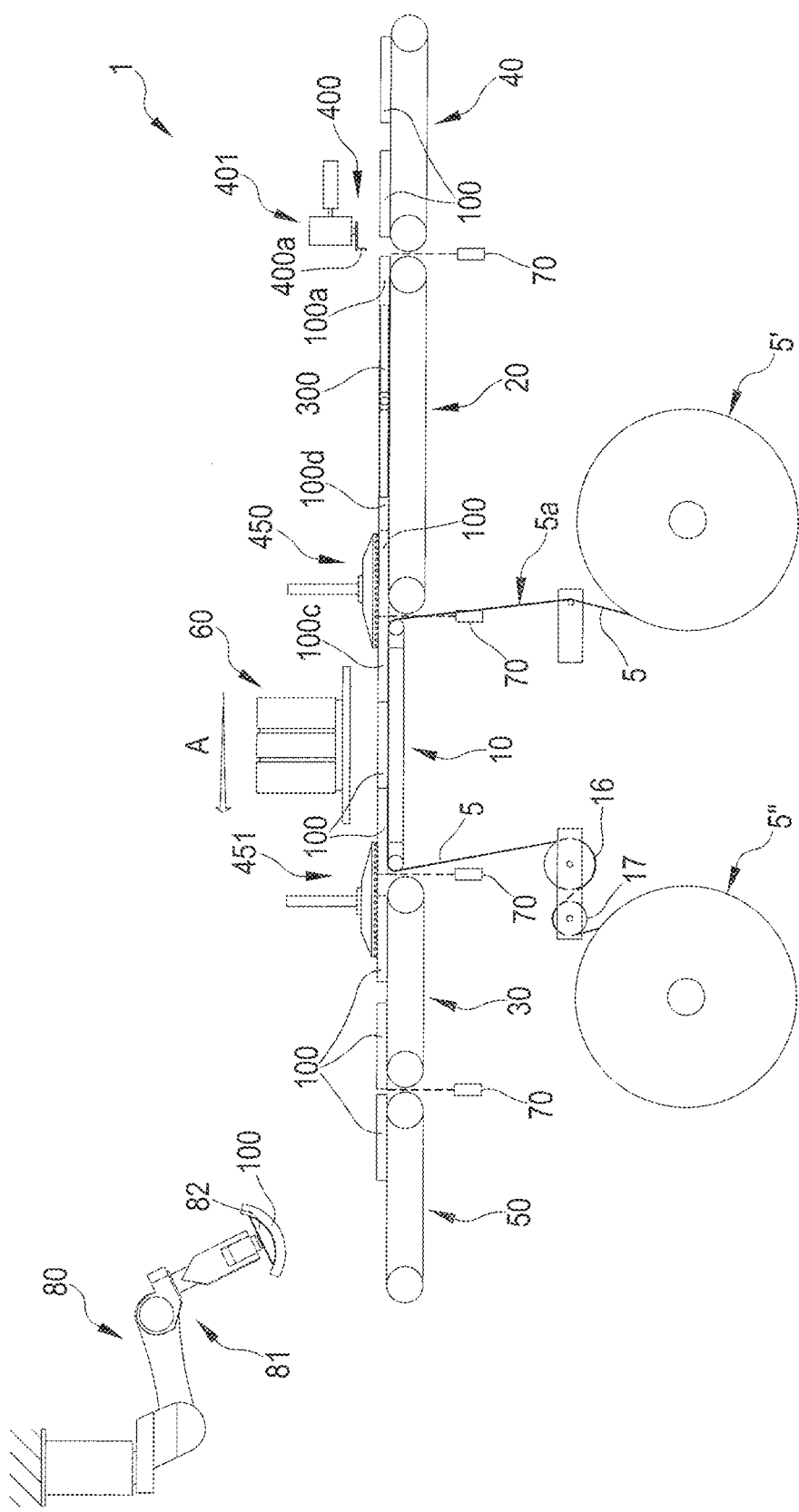
FIGS. 3-5 are simplified schematic side views of the apparatus of FIG. 1 in two further operative configurations thereof.
Figure 4:
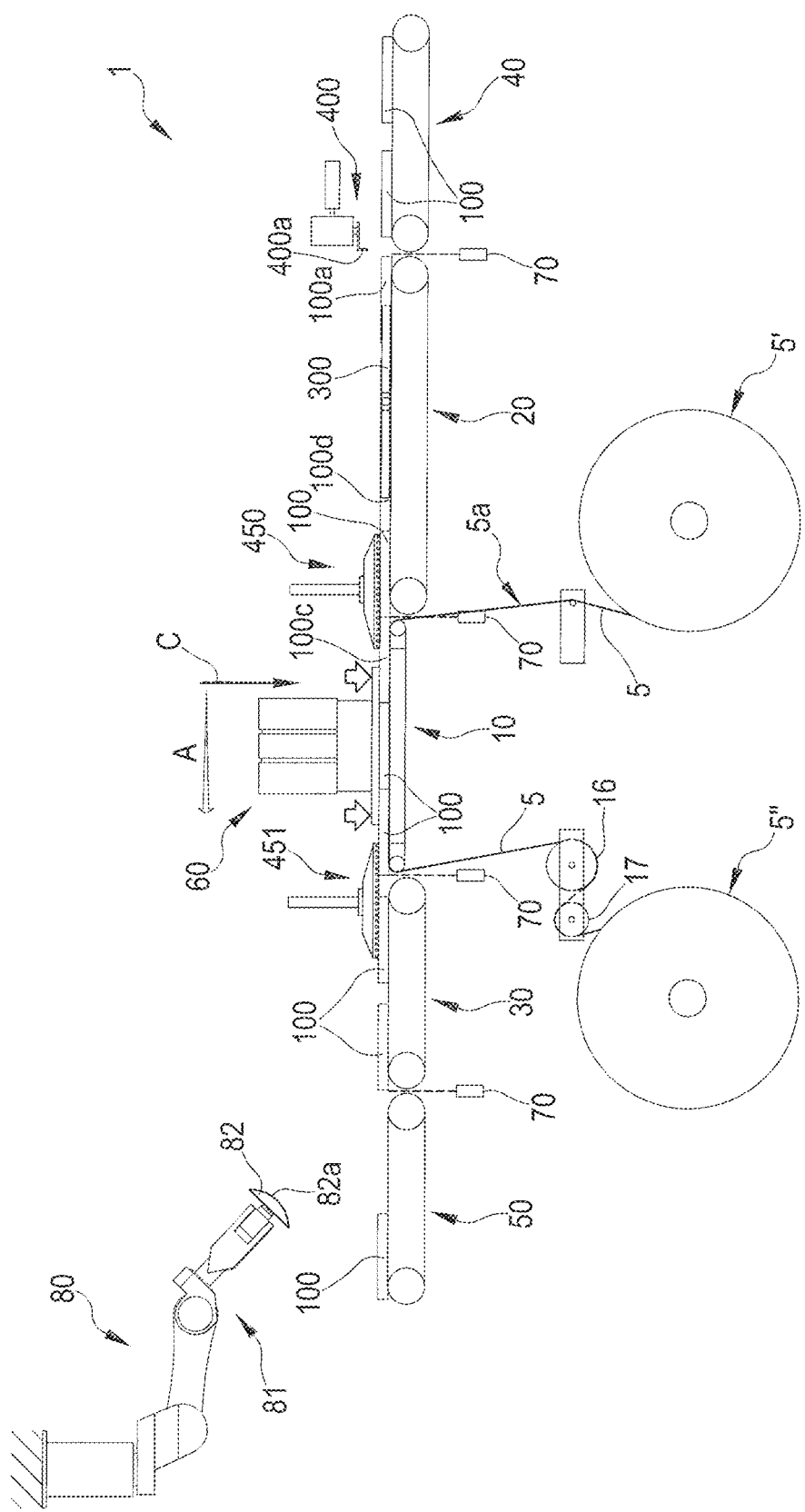

As illustrated in FIGS. 1-10, above the central portion 10''' of the service plane 10 there is a pressing member 60 which can be periodically moved along a substantially vertical direction to press each time at least some of the noise-reducing elements 100 which are above said central portion 10''' against the continuous film 5 supported by the service plane 10, so as to ensure that each of such noise-reducing elements 100 can adhere firmly to the respective portion of layer of adhesive material 5a (FIG. 4).

As illustrated in FIG. 2, the pressing element 60 is preferably controlled through actuation of a pneumatic cylinder 61. The pressure force is adjustable through a pressure adjuster 62 and the pressing time can also be set.

As illustrated in FIGS. 1-9, the apparatus 1 comprises, at the feeding belt 20, a first pushing element 300 which can be periodically moved along a horizontal direction B (FIG. 6) perpendicular to the feeding direction A.

The first pushing element 300 is configured to align along the feeding direction A at least two noise-reducing elements 100a, 100b arranged above the feeding belt 20. Such alignment takes place by pushing said at least two noise-reducing elements 100a, 100b through said first pushing element 300 against a reference wall 310 associated with the feeding belt 20 and extending parallel to the feeding direction A.

After the alignment has occurred, the noise-reducing elements 100a, 100b remain aligned along the feeding direction A when they are transferred from the feeding belt 20 to the service plane 10 and, thereafter, to the conveyor belt 30 and to the unloading belt 50.

As illustrated in FIG. 2, the first pushing element 300 is controlled by a drive member 301 that is in turn associated with an adjusting member 302 configured to adjust the stroke of the first pushing element 300 along the direction B as a function of the width of the noise-reducing elements 100 being used each time.

Preferably, the movement of the first pushing element 300 along the direction B is obtained through actuation of a pneumatic cylinder and its stroke is mechanically adjustable through the adjustment of contrast screws (not illustrated).

Figure 7:
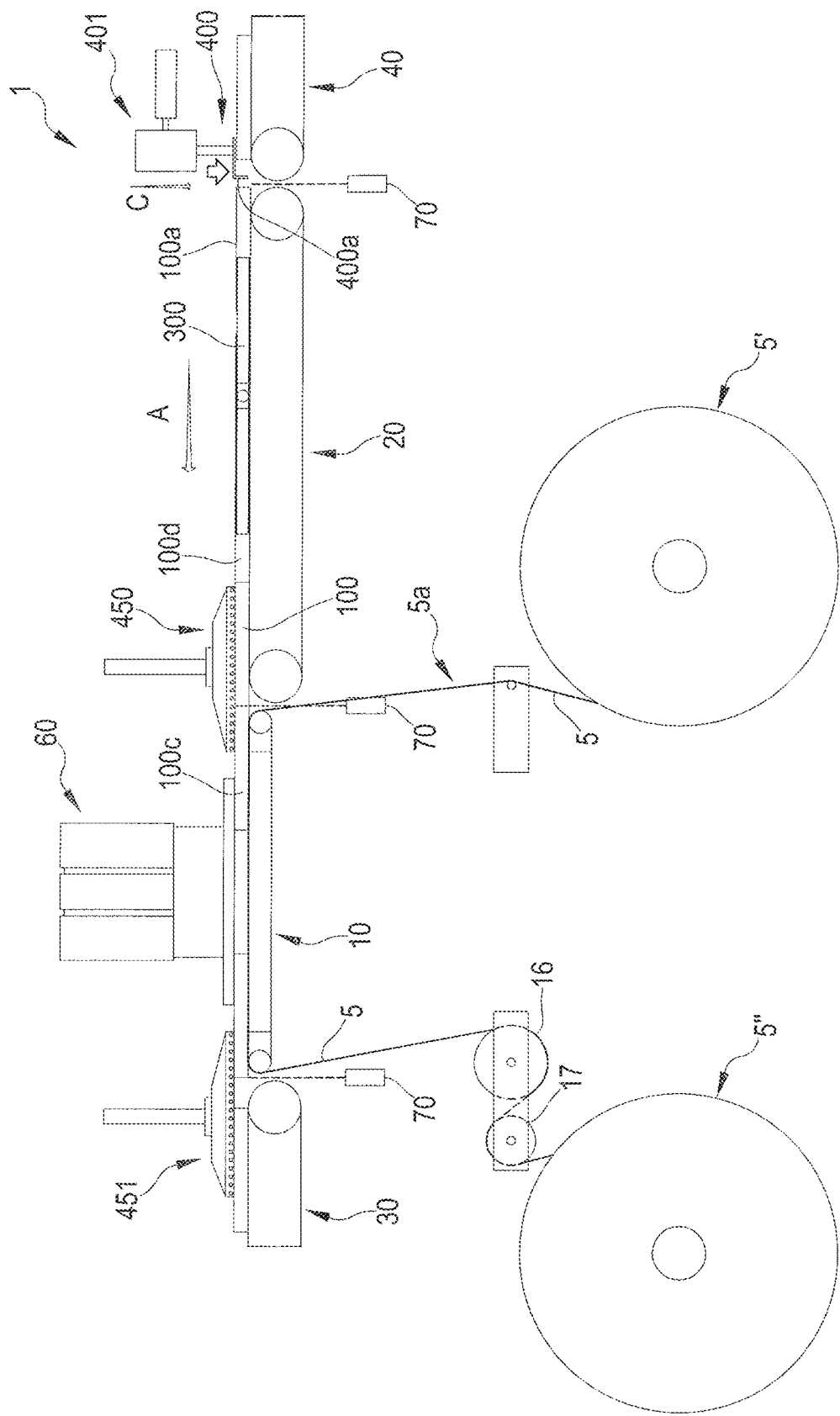
FIGS. 7 and 8 are simplified schematic side views of the apparatus of FIG. 1 in further operative configurations thereof.
Figure 8:
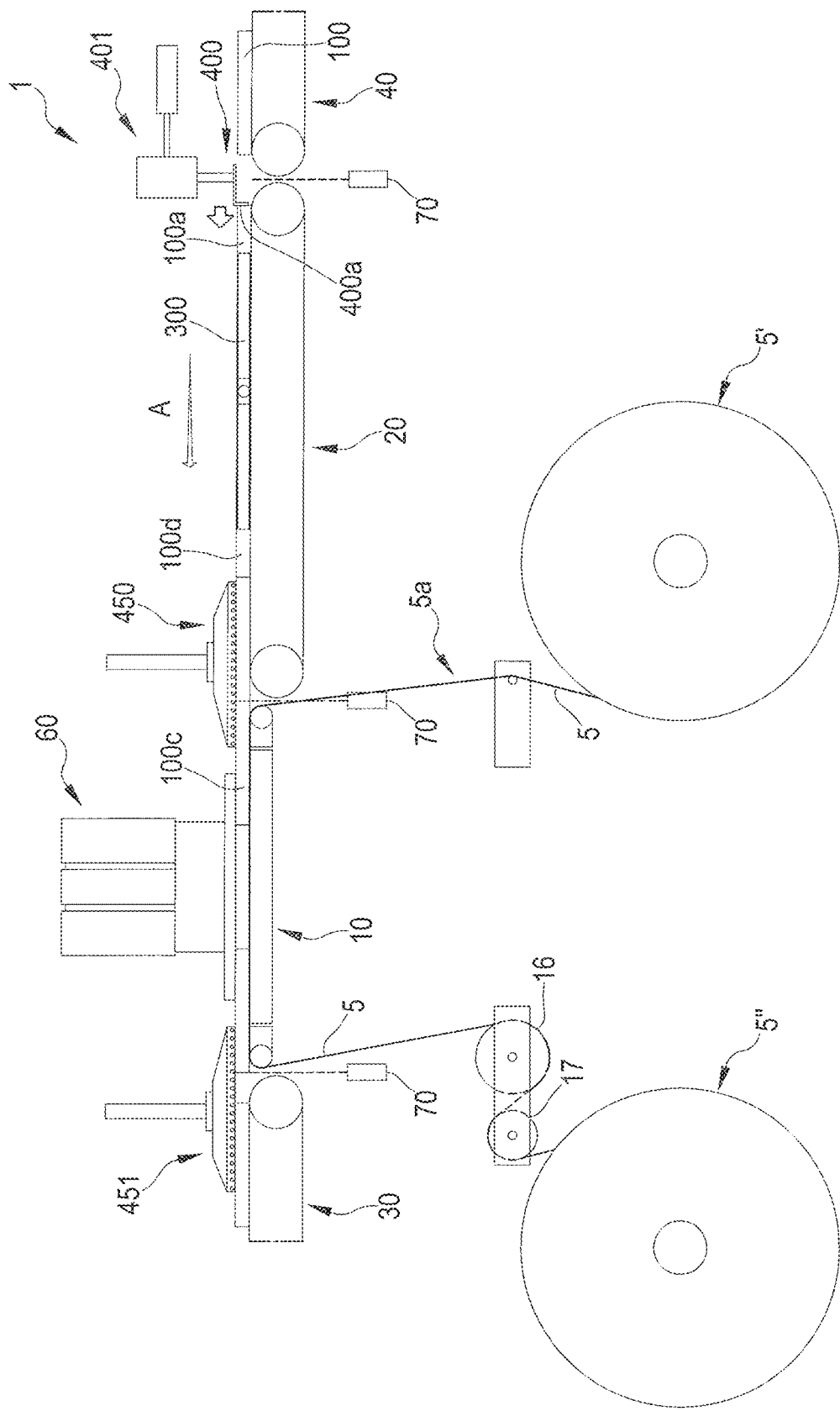
Figure 9:
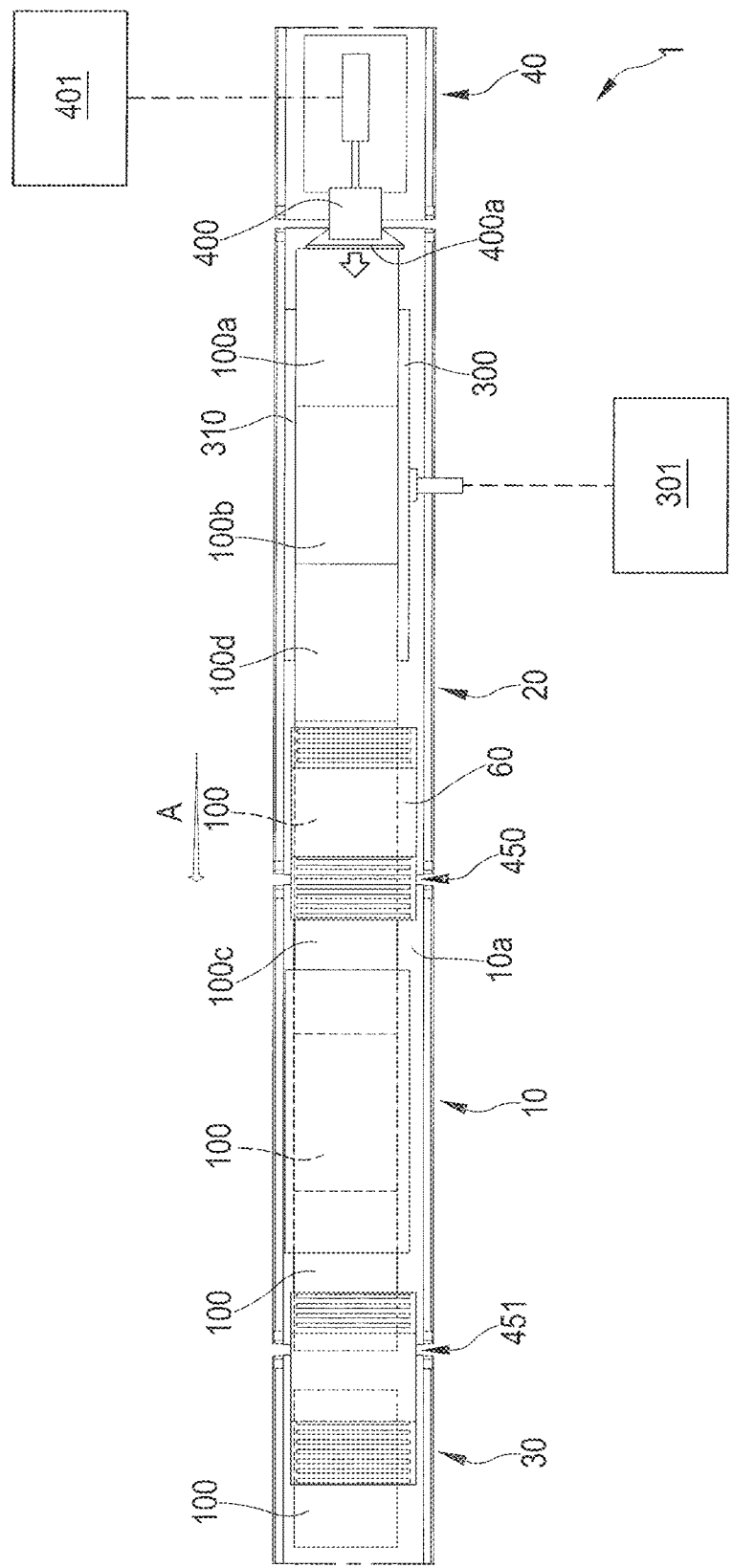
FIG. 9 is a simplified schematic view from above of the apparatus of FIG. 1 in the operative configuration of FIG. 8.

The apparatus 1 also comprises, close to a tail portion of the feeding belt 20, a second pushing element 400 periodically movable both along a vertical direction C (FIG. 7) and along the feeding direction A (FIGS. 8 and 9).

The second pushing element 400 is configured to bring the noise-reducing elements 100a, 100b into mutual contact along the feeding direction A, after such noise-reducing elements 100a, 100b have been brought into abutment against said reference wall 310 by the first pushing element 300.

The second pushing element 400 comprises a vertical plate 400a intended to push the noise-reducing element 100a against the noise-reducing element 100b along the feeding direction A.

As illustrated in FIG. 1, the second pushing element 400 is controlled by a drive member 401 which is in turn associated with an adjusting member 402 configured to adjust the stroke of the second pushing element 400 along the feeding direction A as a function of the length of the noise-reducing elements 100 being used each time.

Preferably, the movement of the second pushing element 400 along the vertical direction C is obtained through actuation of a pneumatic cylinder. Such movement is controlled by a pair of magnetic end stops (not illustrated) applied directly onto such a pneumatic cylinder.

Preferably, the movement of the second pushing element 400 along the feeding direction A is obtained through actuation of an electric motor. Such movement is adjusted, through the adjusting member 402, as a function of the length of the noise-reducing elements 100 being used.

The apparatus 1 also comprises a plurality of first contrast rollers 450 arranged at the tail portion 10' of the service plane 10 and a plurality of second contrast rollers 451 arranged at the head portion 10" of the service plane 10.

Preferably, the contrast rollers 450 are arranged above a head portion of the feeding belt 20 and extend up to above the tail portion 10' of the service plane 10. They prevent the noise-reducing elements 100 to lift from the feeding belt 20 and from the service plane 10 because of the push exerted by the second pushing element 400 along the feeding direction A during the compacting operations of the noise-reducing elements 100.

Preferably, the contrast rollers 451 are arranged above the head portion 10" of the service plane 10 and extend up to above a tail portion of the conveyor belt 30. They prevent the noise-reducing elements 100 to lift from the service plane 10 and from the conveyor belt 30 during the passage from the service plane 10 to the conveyor belt 30.

In an embodiment that is not illustrated, a hot wire is arranged between the service plane 10 and the conveyor belt 30, which in practice acts as a blade. Such a hot wire is movable, preferably along a substantially vertical direction, between a rest position, distal from the upper surface 10a of the service plane 10, and an operative position in which the hot wire intersects the upper surface 10a of the service plane 10.

When it is in its rest position, the hot wire does not perform any action. On the other hand, when the hot wire is in its operative position, it cuts the layer of adhesive material 5a arranged between a first noise-reducing element 100 just transferred to the conveyor belt 30 and the one which is associated with a second noise-reducing element 100 adjacent to the aforementioned noise-reducing element 100 and about to be transferred from the service plane 10 to the conveyor belt 30, separating the layer of adhesive material 5a associated with the aforementioned first noise-reducing element 100 from the layer of adhesive material 5a associated with the aforementioned second noise-reducing element 100.

The aforementioned embodiment can be used when the adhesive material 5a has very strong internal bonds.

In the embodiment illustrated in the attached drawings the aforementioned hot wire is not used. Such an embodiment can be used when the adhesive material 5a used does not have very strong internal bonds. In this case, the detachment of the layer of adhesive material 5a adhered to the noise-reducing element transferred to the conveyor belt 30 from the layer of adhesive material 5a associated with the noise-reducing element 100 present on the service plane 10 only takes place as a consequence of a variation of speed of the conveyor belt 30 with respect to the continuous film 5 and thanks to the holding action exerted on the service plane 10 by the pressure force exerted on the noise-reducing element 100 by the pressing member 60.

The apparatus 1 also comprises, close to a head portion of the unloading belt 50, a gripping member which is preferably a robotized arm 80 of the anthropomorphous type having at least six axes and intended to pick the noise-reducing elements 100 up from the loading belt 50 and to position them in the desired position on the radially inner surface 501 of the tyre 500. Such positioning can include applying a suitable pressure on the radially inner surface 501 of the tyre 500.

The robotized arm 80 is preferably of the aerial type (i.e. it is configured to be associated with the ceiling or with an aerial beam) so as not to occupy space on the ground. However, a robotized arm constrained to the ground can also be used as an alternative.

The robotized arm 80 comprises an articulated linkage 81 that allows the movement of the robotized arm 80 along any direction in space.

At a free end thereof, the robotized arm 80 comprises a gripping member 82 suitable for picking the noise-reducing elements 100 up from the unloading belt 50 and for holding them in position during the movement of the robotized arm 80 towards the tyre 500.

In an embodiment thereof, the gripping member 82 comprises a plurality of suction channels (not illustrated) fluid-dynamically connected to a suction device capable to be selectively activated. Therefore, the gripping of the noise-reducing elements 100 from the unloading belt 50 and their holding during the movement of the robotized arm 80 towards the tyre 500 takes place thanks to the suction force exerted on the noise-reducing elements 100 once the aforementioned suction device has been activated. The release of the noise-reducing elements 100 on the radially inner surface 501 of the tyre 500, on the other hand, takes place following the deactivation of the aforementioned suction device.

The gripping member 82 comprises a gripping surface 82a having a curved profile. Preferably, the profile of the gripping surface 82a has a radius of curvature substantially equal to that of the inner surface 501 of the tyre 500 along the circumferential direction thereof. In particular, the value of the radius of curvature of the gripping surface 82a is substantially equal to an average value of the radii of curvature of the inner surfaces of a batch of tyres 500, 600 on which it is wished to glue the noise-reducing elements 100.

Preferably, the gripping surface 82a has substantially the same extension as the one of the noise-reducing element 100.

In an alternative embodiment, the gripping member 82 can comprise a plurality of retractable hooks capable of being suitably controlled to capture/release the noise-reducing elements 100.

Figure 10:
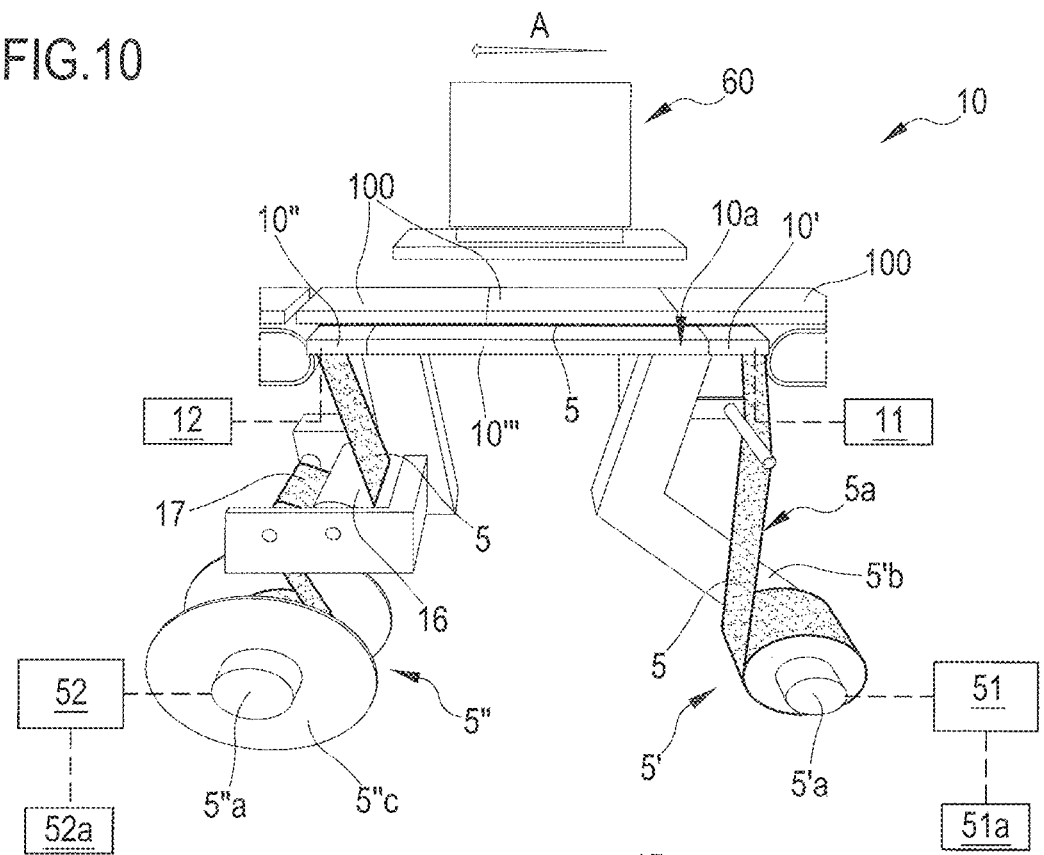
FIG. 10 is a schematic perspective view of a portion of the apparatus of FIG. 1.

With reference to FIG. 10, the unwinding reel 5' preferably comprises a pneumatically-controlled spindle 5'a that, after a radial expansion thereof, allows a roll of continuous film 5 to be constrained in rotation on the spindle 5'a and the aforementioned roll to be locked in abutment against an abutment wall 5'b that lies on the same vertical plane on which the reference wall 310 lies.

Similarly, the winding reel 5" preferably comprises a pneumatically-controlled spindle 5"a that, through the radial expansion thereof, allows a collection roll of the continuous film 5 to be constrained in rotation on the spindle 5"a and the aforementioned roll to be locked in abutment against an abutment wall 5"b also lying on the same vertical plane on which the reference wall 310 lies.

The winding reel 5" further comprises a disc 5"c fitted onto the spindle 5"a and constrained on the latter in a position such as to prevent movements of the continuous film 5 with respect to the rotation axis of the spindle 5"a during the winding of the continuous film 5 on the roll mounted on the spindle 5"a. The position of the disc 5"c on the spindle 5"a varies as the width of the noise-reducing elements 100 used on each occasion varies.

Figure 11:
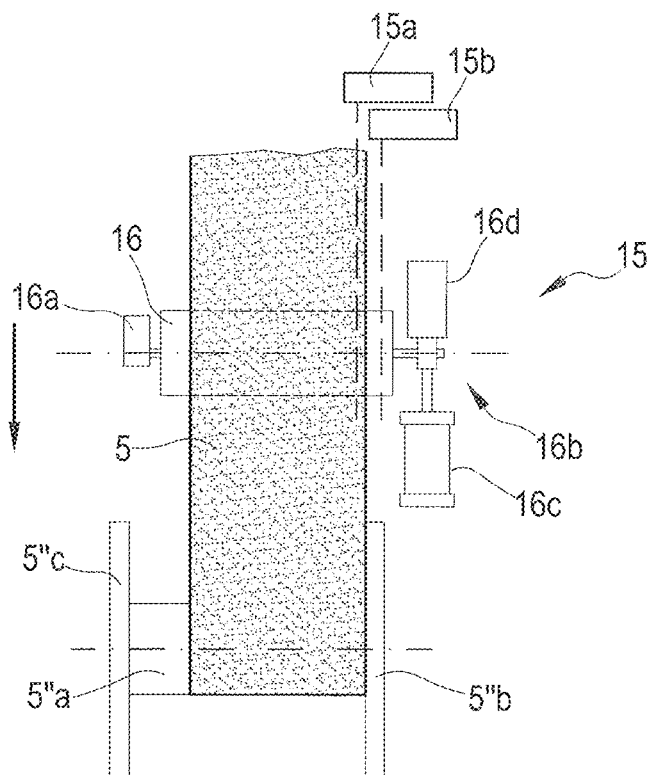
FIG. 11 is a schematic view from above of a detail of the portion of FIG. 10.

With reference to FIGS. 10 and 11, the apparatus 1 further comprises an adjusting device 15 configured to adjust the position of the continuous film 5 on the upper surface 10a of the service plane 10 in a direction perpendicular to the feeding direction A (i.e. along the aforementioned direction B). Such a device 15 allows the correct centering of the continuous film 5 with respect to the noise-reducing elements 100 arranged on the upper surface 10a of the service plane 10.

The adjusting device 15 comprises a pair of photocells 15a, 15b that detect the position of a longitudinal edge of the continuous film 5 within a tolerance range corresponding to the distance between the two photocells 15a, 15b (equal for example to 1 mm). In the specific example illustrated in FIG. 11, the photocells 15a, 15b are arranged at the winding reel 5".

The adjusting device 15 further comprises an inclined roller 16 arranged between the winding reel 5" and the service plane 10. The inclination of the inclined roller 16 is modified when the photocells 15a, 15b detect that the edge of the continuous film 5 is outside of the aforementioned tolerance range. The variation of inclination of the inclined roller 16 results in a movement of the continuous film 5 along the aforementioned direction perpendicular to the feeding direction A.

The inclined roller 16 is supported, at an end thereof, by a support block 16a and, at the opposite end thereof, by an abutment block 16b.

The abutment block 16b comprises a pneumatic cylinder 16c and an abutment element 16d. The movement of the piston of the pneumatic cylinder 16c with respect to the abutment element 16d results in a variation of the inclination of the inclined roller 16. Photocells analogous to photocells 15a, 15b described above are provided at the unwinding reel 5' to control the position of the continuous film 5 before it passes on the upper surface 10a of the service plane 10.

Further photocells analogous to photocells 15a, 15b described above can be provided at the upper surface of the service plane 10 to control the position of the continuous film 5 on such a surface along the direction perpendicular to the feeding direction A.

The actuator devices 11 and 12 and the adjusting device 15 cooperate to obtain the centering of the continuous film 5 on the upper surface 10a of the service plane 10 with respect to the noise-reducing elements 100 arranged on such a surface. Such centering is therefore obtained thanks to the relative movement of the continuous film 5 and of the tail 10' and head 10" portions of the service plane 10 with respect to the central portion 10'" of the service plane 10.

A return roller 17 is arranged between the winding reel 5" and the inclined roller 16. The return roller 17 is provided with an encoder to detect the peripheral speed of such a roller, corresponding to the advancing speed of the continuous film 5 along the feeding direction A. The signal detected by the encoder is used to drive the rotation of the winding reel 5" so as to create a constant tension in the portion of continuous film 5 arranged between the return roller 17 and the winding reel 5". Such a signal is also used to adjust the speed of the feeding belt 20, so as to drive this belt with a speed slightly higher than the advancing speed of the continuous film 5, in order to avoid that the compacted noise-reducing elements can move away from one another along the feeding direction A.

As illustrated in FIG. 1, the apparatus 1 further comprises a plurality of photocells, all indicated with 70, arranged between the loading belt 40 and the feeding belt 20, between the latter and the conveyor belt 30 and between the latter and the unloading belt 50, respectively, to intercept the passage of the noise-reducing elements 100 and consequently drive the drive members 51, 52, 220, 230, 240, 250 so that the continuous film 5 and the belts 20, 30, 40 and 50 move along the feeding direction A with the desired speed and timing.

A preferred embodiment of a process for automatically applying the noise-reducing elements 100 to the tyre 500 will now be described. In particular, this process can be carried out by the apparatus 1 described above.

Initially, as illustrated in FIGS. 1 and 2, the noise-reducing elements 100 are positioned in sequence on the loading belt 40 so as to be spaced apart from one another.

The loading belt 40 is moved with a predetermined speed along the feeding direction A. Such movement can take place sequentially and alternately with respect to the positioning of the noise-reducing elements 100 on the loading belt 40, each time with an advancing pitch having a predetermined length, or during a continuous movement of the loading belt 40 along the feeding direction A.

The positioning of the noise-reducing elements 100 on the loading belt 40 can be carried out by a robotized arm or manually by an operator, as described earlier.

The noise-reducing elements 100 are subsequently transferred from the loading belt 40 to the feeding belt 20. Such a transfer initially takes place as a consequence of the movement of the loading belt 40 along the feeding direction A with an advancing pitch of predetermined length, while keeping the feeding belt 20 stationary. When a head portion of each noise reducer 100 is arranged above the feeding belt 20, the movement of the loading belt 40 stops and only the feeding belt 20 moves along the feeding direction A until the entire noise-reducing element 100 is arranged above the feeding belt 20.

In this way the operative configuration illustrated in FIG. 3 is reached, in which a noise-reducing element 100a has just been transferred from the loading belt 40 to the feeding belt 20.

In such an operative configuration, the noise-reducing element 100a is neither aligned with, nor in contact with, the noise-reducing element 100b previously transferred from the loading belt 40 to the feeding belt 20.

The first pushing element 300 is then activated to obtain the alignment of the noise-reducing elements 100a and 100b along the feeding direction A and, subsequently, with the activation of the second pushing element 400 to obtain the compacting of the noise-reducing elements 100a and 100b along the feeding direction A (FIGS. 6-9).

The alignment and compacting operations are carried out while the loading 40 and feeding 20 belts are kept stationary.

The alignment comprises the activation of the first pushing element 300 and its movement along the direction B until the noise-reducing elements 100a and 100b are brought into abutment against the reference wall 310. The stroke of the first pushing element 300 is defined as a function of the width of the noise-reducing elements 100 being used.

The subsequent compacting is carried out while the pressing member 300 is kept in the aforementioned pushing position against the reference wall 310 and comprises the activation of the second pushing element 400 and its movement firstly along the vertical direction C and, subsequently along the feeding direction A (FIG. 7).

The movement of the second pushing element 400 along the vertical direction C is carried out to position the vertical plate 400a upstream of the noise-reducing element 100a along the feeding direction A.

The subsequent movement of the second pushing element 400 along the feeding direction is carried out to push the noise-reducing element 100a along the feeding direction A until it is brought into contact against the noise-reducing element 100b (FIGS. 8 and 9). The stroke of the second pushing element 400 along the feeding direction A is defined as a function of the length of the noise-reducing elements 100 and is such as to generate a certain contact interference between the noise-reducing element 100a and the noise-reducing element 100b. Such a provision allows the noise-reducing elements 100a and 100b to stay in mutual contact when, once compacting has occurred, the second pushing element 400 is moved away from the noise-reducing element 100a to proceed with the subsequent operations described hereinafter.

The push exerted by the pressing member 400 on the noise-reducing element 100a causes the compacting of the noise-reducing element 100a against the reducing element 100b and against all of the noise-reducing elements arranged downstream of the noise-reducing element 100b along the feeding direction A (and thus already compacted and aligned with the noise-reducing element 100b) and arranged on the service plane 10 (between these there is the one indicated in the attached figures with 100c) and on the feeding belt 20 (between these there is the one indicated in the attached figures with 100d).

The noise-reducing elements 100, once aligned and compacted, are transferred from the feeding belt 20 to the service plane 10 as a consequence of the synchronous movement of the feeding belt 20 and of the continuous film 5 along the feeding direction A with an advancing pitch of predetermined length (preferably equal to the length of the noise-reducing elements 100). The movement of the continuous film 5 comprises the unwinding of a longitudinal portion of the continuous film 5, provided with the layer of adhesive material 5a, from the unwinding reel 5' and the winding of a corresponding longitudinal portion of the continuous film 5, free of adhesive material 5a, on the winding reel 5".

Figure 5:
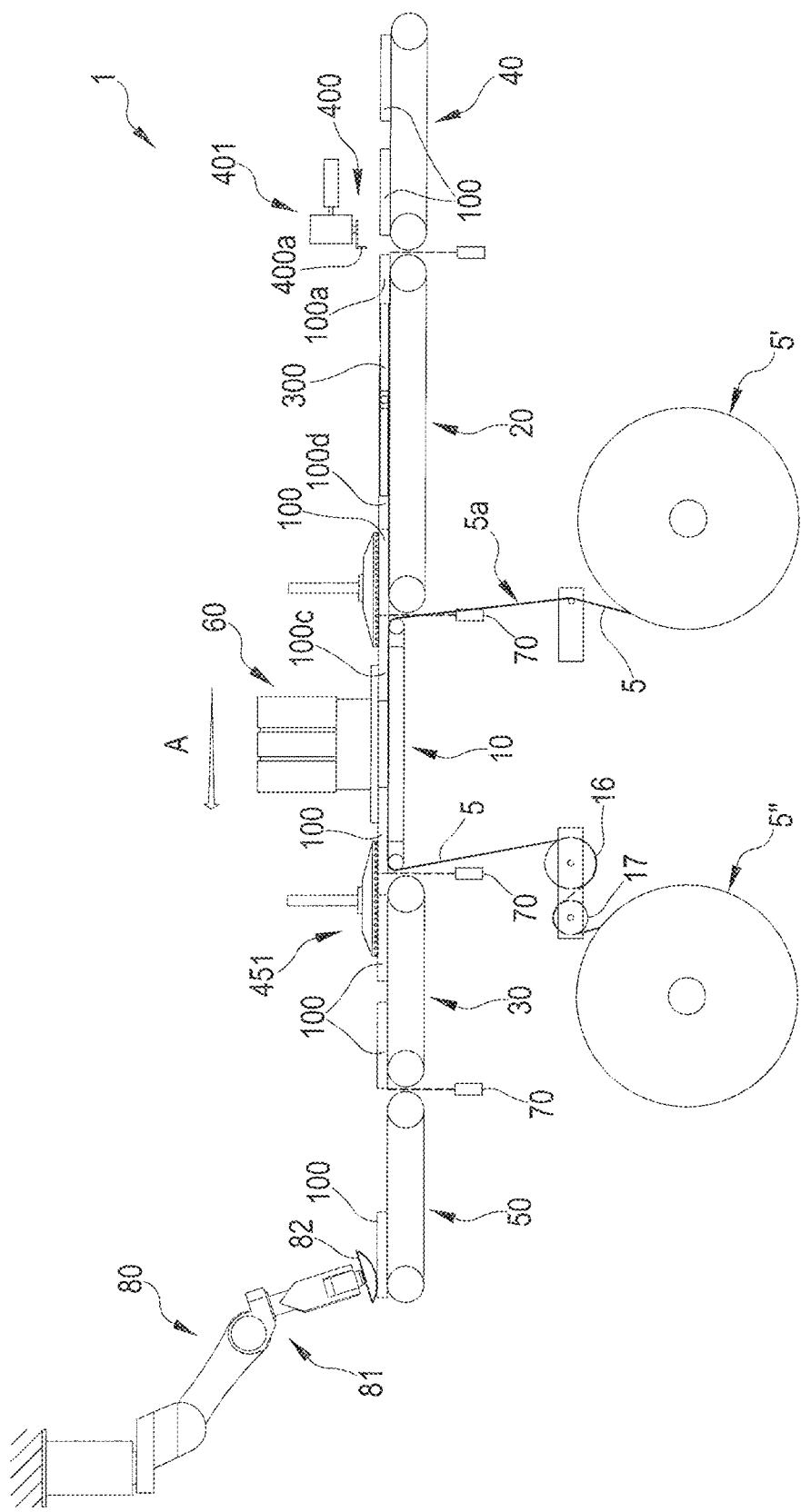
Figure 6:
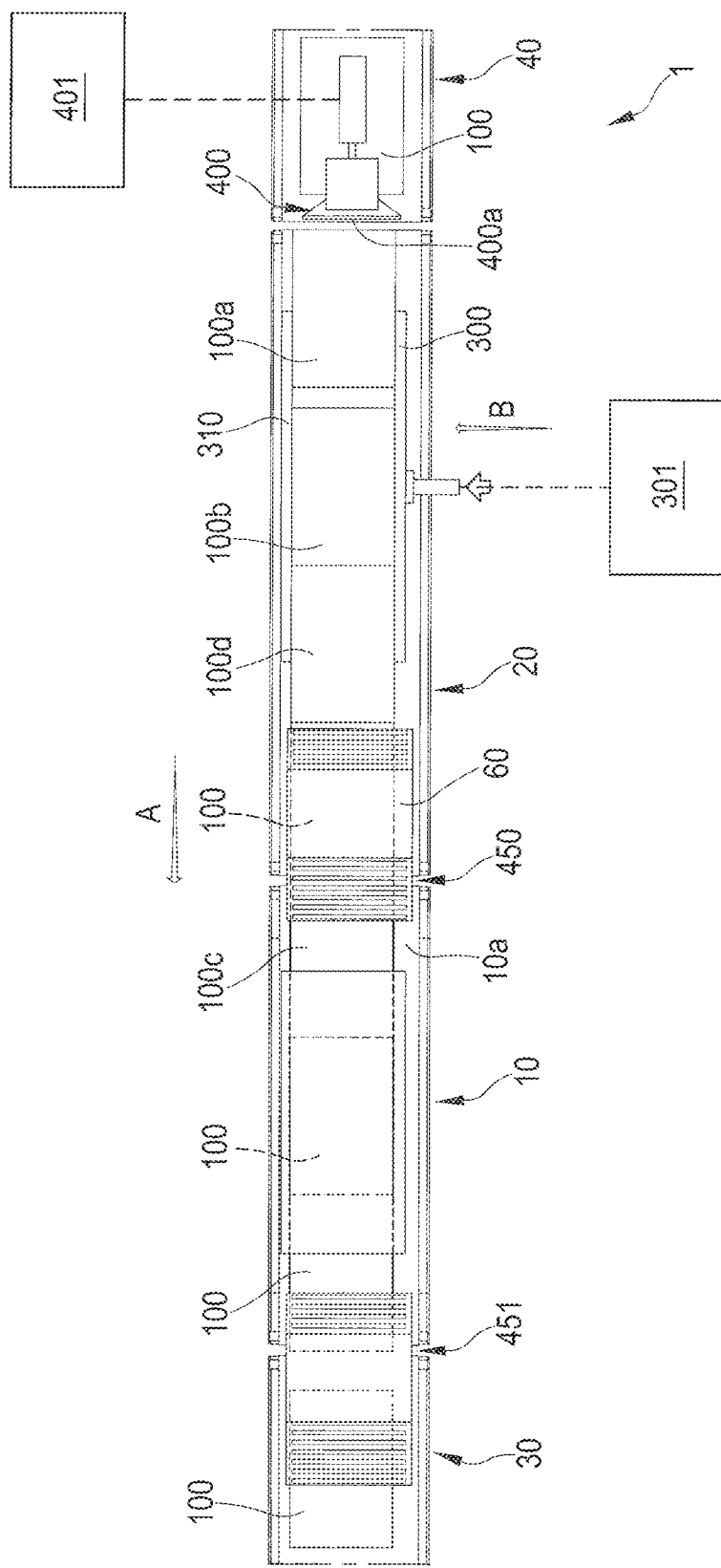
FIG. 6 is a simplified schematic view from above of the apparatus of FIG. 1 in the operative configuration of FIG. 5.

The noise-reducing elements 100 are subsequently pressed against the upper surface 10a of the service plane 10 so that they can adhere firmly to the layer of adhesive material 5a associated with the continuous film 5 arranged on the upper surface 10a of the service plane 10 (FIGS. 4 and 5). Such pressure is exerted by activating the pressing member 60 arranged above the service plane 10, after having interrupted the movement of the continuous film 5 and of the feeding belt 20 along the feeding direction A.

If necessary, the position of the continuous film 5 on the service plane 10 in a direction perpendicular to the feeding direction A can be suitably adjusted through the adjusting device 15 described above, so that the noise-reducing elements 100 that are positioned on the continuous film 5 are centered with respect to the latter along the aforementioned perpendicular direction.

The noise-reducing elements 100 are subsequently transferred from the service plane 10 to the conveyor belt 30.

Such a transfer initially comprises the synchronous movement of the continuous film 5 and of the conveyor belt 30 along the feeding direction A with an advancing pitch of predetermined length (preferably equal to the length of the noise-reducing elements 100). Thereafter, in particular as soon as each noise-reducing element 100 is at least partially arranged above the conveyor belt 30, only the conveyor belt 30 moves along the feeding direction A with the aforementioned advancing pitch, while keeping the continuous film 5 stationary.

In this way, a desired spacing of the noise-reducing elements 100 is obtained on the conveyor belt 30, as shown in FIGS. 1 and 2. For example, it is ensured that the noise-reducing elements 100 are mutually spaced apart on the conveyor belt 30 by a distance greater than about 1 mm, preferably comprised between about 1 mm and about 3-5 mm.

If the internal bonds of the layer of adhesive material 5a are not very strong, the movement of the conveyor belt 30 with respect to the continuous film 5 also makes it possible to obtain a clean and precise detachment of the layer of adhesive material 5a associated with the noise-reducing element 100 arranged on the conveyor belt 30 from the layer of adhesive material 5a associated with the continuous film 5 that winds on the winding reel 5".

If, on the other hand, the internal bonds of the layer of adhesive material 5a are such as not to allow the aforementioned clean and precise detachment, such detachment is obtained through the cutting carried out by the aforementioned hot wire. Advantageously, the movement of the conveyor belt 30 with respect to the continuous film 5 makes it possible to sufficiently move the noise-reducing element 100 away from the noise-reducing material 100 about to be transferred from the service plane 10 to the conveyor belt 30, so as to prevent the hot wire from accidentally cut one or both of the aforementioned noise-reducing elements 100.

The noise-reducing elements 100 are subsequently transferred from the conveyor belt 30 to the unloading belt 50.

Such transfer initially comprises the synchronous movement of the conveyor belt 30 and of the unloading belt 50 along the feeding direction A with a first advancing pitch of predetermined length. Thereafter, preferably as soon as each noise-reducing element 100 is entirely arranged above the unloading belt 50, only the unloading belt 50 moves along the feeding direction A with a second advancing pitch greater than or equal to the aforementioned first advancing pitch, while keeping the conveyor belt 30 stationary.

The noise-reducing elements 100 arranged on the unloading belt 50 are subsequently picked in sequence up from the unloading belt 50 by the robotized arm 80 to be transferred towards the tyre 500 and positioned (and thus glued) at respective predetermined positions on the radially inner surface 501 of the latter. Such picking up and transferring is carried out by the gripping member 82 of the robotized arm 80.

The picking of the noise-reducing elements 100 up from the unloading belt 50 and the holding thereof during the movement towards the tyre 500 takes place thanks to the suction force exerted on the noise-reducing elements 100 by the gripping member 82 (FIGS. 1 and 3).

The aforementioned operations of picking the noise-reducing element 100 up from the unloading belt 50 and gluing on the radially inner surface 501 of the tyre 500 are repeated in sequence for a plurality of noise-reducing elements 100 until the desired coverage of the radially inner surface 501 of the tyre 500 is reached.

As illustrated in FIGS. 4 and 5, the robotized arm 80, after having deposited a first noise-reducing element 100 on the tyre 500, is moved towards the unloading belt 50 to pick up a second noise-reducing element 100 that meanwhile has been moved along the feeding direction A until the picking up position previously taken up by the aforementioned noise reducing element has been reached.

The robotized arm can be configured to pick up the noise-reducing element 100 along a first direction or along a second direction perpendicular to the first direction and to position such a noise-reducing element 100 on the radially inner surface 501 of the tyre 500 with the larger dimension of the noise-reducing element 100 arranged parallel to the circumferential direction of the tyre 500 (as illustrated in FIG. 12) or perpendicular to such a circumferential direction, depending on the size of the tyre being used each time.

Once the gluing operations of all of the noise-reducing elements 100 are complete, the tyre 500 is for example picked up by a suitable robotized arm and replaced by the tyre 600.

The process described above is repeated identically to apply a plurality of noise-reducing elements 100 on the radially inner surface of the tyre 600.

The present invention has been described with reference to some preferred embodiments. Different modifications can be brought to the embodiments described above, still remaining within the scope of protection of the invention, defined by the following claims.

The invention claimed is:

1. A process for applying noise-reducing elements to a tyre for vehicle wheels, comprising:
   arranging a plurality of noise-reducing elements on a feeding belt movable along a predetermined feeding direction;
   aligning at least two of said noise-reducing elements along said feeding direction on said feeding belt by pushing said at least two noise-reducing elements in abutment against a reference wall parallel to said feeding direction through a first pushing element moved in a direction perpendicular to said feeding direction;
   bringing said at least two noise-reducing elements into mutual contact along said feeding direction on said feeding belt while said at least two noise-reducing elements are being pushed against said reference wall by said first pushing element;
   transferring said at least two noise-reducing elements from said feeding belt on a service plane arranged downstream of said feeding belt along said feeding direction and having, on an upper surface thereof, a continuous film which supports a layer of adhesive material;
   applying said layer of adhesive material onto a lower surface of each of said at least two noise-reducing elements taking it from said continuous film;
   transferring one by one said at least two noise-reducing elements from said service plane to a conveyor belt arranged downstream of said service plane along said feeding direction; and
   positioning one by one said at least two noise-reducing elements on a radially inner surface of a tyre.

2. The process according to claim 1, wherein arranging said plurality of noise-reducing elements on said feeding belt comprises positioning said noise-reducing elements in succession on a loading belt arranged upstream of said feeding belt along said feeding direction.

3. The process according to claim 2, further comprising, during or after positioning said noise-reducing elements on said loading belt and before aligning said at least two noise-reducing elements:
moving said loading belt along said feeding direction, while keeping said feeding belt stationary, until an end portion of a first noise-reducing element of said at least two noise-reducing elements is arranged above said feeding belt; and, then
moving said loading belt and said feeding belt in synchrony along said feeding direction until said first noise-reducing element is entirely arranged above said feeding belt.

4. The process according to claim 1, wherein said at least two noise-reducing elements have a predetermined width and wherein said at least two noise-reducing elements are pushed against said reference wall through said first pushing element by moving said first pushing element in said direction perpendicular to said feeding direction, occurs with a predetermined stroke defined as a function of the width of said at least two noise-reducing elements.

5. The process according to claim 4, wherein bringing said at least two noise-reducing elements into mutual contact comprises pushing a first noise-reducing element of said at least two noise-reducing elements against a second noise-reducing element of said at least two noise-reducing elements, said second noise-reducing element being arranged on said feeding belt downstream of said first noise-reducing element.

6. The process according to claim 5, wherein said at least two noise-reducing elements have a predetermined length and wherein said first noise-reducing element is pushed against said second noise-reducing element through a second pushing element moved along said feeding direction with a predetermined stroke defined as a function of the length of said at least two noise-reducing elements.

7. The process according to claim 6, wherein said first noise-reducing element is pushed against said second noise-reducing element after said second noise-reducing element has been aligned and brought into direct or indirect contact with a third noise-reducing element at least partially arranged on said service plane.

8. The process according to claim 7, wherein said second noise-reducing element is aligned and brought into contact with said third noise-reducing element directly or through interposition of one or more further noise-reducing elements previously aligned and brought into mutual contact along said feeding direction.

9. The process according to claim 8, wherein transferring said at least two noise-reducing elements from said feeding belt on said service plane comprises moving said feeding belt and said continuous film in synchrony along said feeding direction.

10. The process according to claim 9, wherein applying said layer of adhesive material comprises pressing said at least two noise-reducing elements against the upper surface of said service plane.

11. The process according to claim 10, wherein transferring one by one said at least two noise-reducing elements from said service plane to said conveyor belt comprises:
moving said continuous film and said conveyor belt in synchrony along said feeding direction until said first noise-reducing element is at least partially arranged above said conveyor belt; and then
moving said conveyor belt along said feeding direction while keeping said continuous film stationary.

12. The process according to claim 11, further comprising, after having transferred said at least two noise-reducing elements to said conveyor belt and before positioning said at least two noise-reducing elements on said tyre, transferring one by one said at least two noise-reducing elements to an unloading belt arranged downstream of said conveyor belt along said feeding direction.

13. The process according to claim 12, wherein transferring said at least two noise-reducing elements to said unloading belt is achieved as a consequence of the synchronous movement of said conveyor belt and of said unloading belt along said feeding direction.

14. The process according to claim 13, further comprising, after having transferred each noise-reducing element to said unloading belt and before positioning said at least two noise-reducing elements on said tyre, moving said unloading belt along said feeding direction while keeping said conveyor belt stationary.

15. The process according to claim 14, further comprising adjusting the position of said continuous film on the upper surface of said service plane along the direction perpendicular to said feeding direction.

16. The process according to claim 15, further comprising adjusting the speed of said feeding belt as a function of the advancing speed of said continuous film on said service plane.

17. The process according to claim 1, wherein said bringing said at least two noise-reducing elements into mutual contact along said feeding direction on said feeding belt occurs by periodically moving a second pushing element both i) along a direction orthogonal to said feeding direction and to said direction perpendicular to said feeding direction and ii) along said feeding direction.

18. The process according to claim 17, wherein said second pushing element is placed close to a tail portion of said feeding belt and upstream of said first pushing element and comprises a vertical plate which is movable from a first position wherein the vertical plate is upstream of the feeding belt to a second position wherein the vertical plate is above the feeding belt and upstream of the at least two noise-reducing elements.

* * * * *